United States Patent
Hayes

(10) Patent No.: US 9,745,741 B2
(45) Date of Patent: *Aug. 29, 2017

(54) STRUCTURAL CONNECTION MECHANISMS FOR PROVIDING DISCONTINUOUS ELASTIC BEHAVIOR IN STRUCTURAL FRAMING SYSTEMS

(71) Applicant: Timothy A. Hayes, Whitefish Bay, WI (US)

(72) Inventor: Timothy A. Hayes, Whitefish Bay, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,175

(22) Filed: May 23, 2016

(65) Prior Publication Data

US 2016/0265217 A1 Sep. 15, 2016

Related U.S. Application Data

(63) Continuation-in-part of application No. 14/795,351, filed on Jul. 9, 2015, now abandoned, which is a
(Continued)

(51) Int. Cl.
*E04B 1/98* (2006.01)
*E04H 9/02* (2006.01)
(Continued)

(52) U.S. Cl.
CPC ............ *E04B 1/985* (2013.01); *E04B 1/1903* (2013.01); *E04H 9/024* (2013.01); *F16B 5/0266* (2013.01);
(Continued)

(58) Field of Classification Search
CPC .... E04H 9/024; F16B 7/00; F16B 7/18; F16B 5/0266; E04B 1/985; E04B 1/1903;
(Continued)

(56) References Cited

U.S. PATENT DOCUMENTS 3,418,768 A 12/1968 Cardan
3,605,953 A * 9/1971 Caldwell ................... E04B 1/98
188/268
(Continued)

FOREIGN PATENT DOCUMENTS

CN 101691816 A 4/2010
FR 2558879 A1 8/1985
(Continued)

OTHER PUBLICATIONS

PCT International Search Report and Written Opinion from PCT/US2014/020495, Jun. 26, 2014.

*Primary Examiner* — Brent W Herring
(74) *Attorney, Agent, or Firm* — Ziolkowski Patent Solutions Group, SC

(57) ABSTRACT

A structural frame for a building includes a plurality of columns, beams, and beam-to-column connections. A plurality of braces are positioned in frame bays formed by respective pairs of columns and beams, each brace comprising a multi-piece brace having a plurality of brace portions. A plurality of discontinuous elastic zone connections couple the plurality of beams to the plurality of columns via the plurality of beam-to-column connections and/or couple pieces of the multi-piece brace together. Each of the discontinuous elastic zone connections comprises connection mechanisms and a compression element positioned on each connection mechanism, with each compression element comprising a single component or a plurality of deformable components in a parallel stack, a series stack, or a combination of parallel stacks and series stacks. The compression element is configured to provide elasticity in the structural frame and dampen the effects of transient loads on the structural frame.

18 Claims, 19 Drawing Sheets

Related U.S. Application Data continuation of application No. 13/803,386, filed on Mar. 14, 2013, now Pat. No. 9,080,339.

(51) Int. Cl.
*E04B 1/19* (2006.01)
*F16B 5/02* (2006.01)
*F16B 7/18* (2006.01)
*E04B 1/24* (2006.01)

(52) U.S. Cl.
CPC ........ *F16B 7/18* (2013.01); *E04B 2001/2415* (2013.01); *E04B 2001/2442* (2013.01); *E04B 2001/2448* (2013.01)

(58) Field of Classification Search
CPC ..... E04B 2001/2448; E04B 2001/2415; E04B 2001/2442
USPC .......... 52/167.1, 167.3, 167.4, 167.7, 167.8, 52/573.1
See application file for complete search history.

(56) References Cited

U.S. PATENT DOCUMENTS

| | | | |
|---|---|---|---|
| 3,788,021 A | 1/1974 | Husler | |
| 3,856,242 A | 12/1974 | Cook | |
| 4,047,341 A | 9/1977 | Bernardi | |
| 4,605,106 A | 8/1986 | Fyfe et al. | |
| 4,630,412 A | 12/1986 | Engstrom et al. | |
| 4,727,695 A | 3/1988 | Kemeny | |
| 4,942,703 A | 7/1990 | Nicolai | |
| 5,054,251 A | 10/1991 | Kemeny | |
| 5,175,972 A | 1/1993 | Sridhara | |
| 5,310,157 A | 5/1994 | Platus | |
| 5,347,771 A * | 9/1994 | Kobori | E04H 9/02 188/312 |
| 5,491,938 A * | 2/1996 | Niwa | E04H 9/02 52/167.1 |
| 5,533,307 A | 7/1996 | Tsai et al. | |
| 5,819,484 A | 10/1998 | Kar | |
| 5,946,866 A | 9/1999 | Weglewski et al. | |
| 6,233,884 B1 | 5/2001 | Tipping et al. | |
| 6,247,275 B1 | 6/2001 | Taylor | |
| 6,397,528 B1 | 6/2002 | Rahimian | |
| 6,438,905 B2 | 8/2002 | Constantinou | |
| 6,530,182 B2 | 3/2003 | Fanucci et al. | |
| 6,672,573 B2 | 1/2004 | Berton | |
| 6,681,538 B1 | 1/2004 | Sarkisian | |
| 6,840,016 B1 | 1/2005 | Mualla | |
| 6,931,800 B2 | 8/2005 | Sedrak | |
| 7,076,926 B2 | 7/2006 | Kasai et al. | |
| 7,225,588 B2 | 6/2007 | Nakamura et al. | |
| 7,497,054 B2 | 3/2009 | Takeuchi et al. | |
| 7,516,582 B2 | 4/2009 | Leek | |
| 7,549,257 B2 | 6/2009 | Chuang | |
| 7,584,578 B2 | 9/2009 | Hilmy | |
| 7,712,266 B2 | 5/2010 | Sarkisian | |
| 7,743,563 B2 | 6/2010 | Hilmy | |
| 7,762,026 B2 | 7/2010 | Smelser | |
| 8,001,734 B2 | 8/2011 | Pryor et al. | |
| 8,146,300 B2 | 4/2012 | Bystricky et al. | |
| 8,146,301 B2 | 4/2012 | Bystricky et al. | |
| 8,250,818 B2 | 8/2012 | Tremblay et al. | |
| 8,347,579 B2 | 1/2013 | Gan | |
| 8,353,135 B2 | 1/2013 | Sarkisian | |
| 8,511,025 B2 | 8/2013 | Kawai et al. | |
| 8,881,491 B2 | 11/2014 | Christopoulos et al. | |
| 9,080,339 B2 | 7/2015 | Hayes | |
| 9,540,807 B2 * | 1/2017 | Ueno | E04H 9/02 |
| 2002/0129568 A1 | 9/2002 | Oka | |
| 2004/0250484 A1 * | 12/2004 | Imai | E04H 9/02 52/167.7 |
| 2006/0137288 A1 | 6/2006 | Hulls et al. | |
| 2006/0144006 A1 | 7/2006 | Suzuki et al. | |
| 2007/0245643 A1 | 10/2007 | Ichikawa et al. | |
| 2008/0016794 A1 | 1/2008 | Tremblay et al. | |
| 2008/0250746 A1 * | 10/2008 | Nawrotski | E04H 9/02 52/653.1 |
| 2009/0194921 A1 * | 8/2009 | Smith | F16F 9/20 267/141.1 |
| 2010/0107518 A1 | 5/2010 | Heath | |
| 2010/0163356 A1 * | 7/2010 | Hennecke | F16F 9/3485 188/282.4 |
| 2010/0186317 A1 * | 7/2010 | Kirsten | A47B 47/0008 52/167.8 |
| 2012/0167490 A1 * | 7/2012 | Balducci | E04H 9/021 52/167.3 |
| 2012/0266548 A1 | 10/2012 | Tremblay et al. | |
| 2014/0059950 A1 * | 3/2014 | Marinovic | E04H 9/024 52/167.3 |
| 2014/0059951 A1 * | 3/2014 | Balducci | E04H 9/021 52/167.4 |
| 2014/0090315 A1 | 4/2014 | Imai et al. | |
| 2014/0116825 A1 * | 5/2014 | Lindeman | F16F 9/464 188/266.2 |
| 2014/0259950 A1 | 9/2014 | Thompson | |
| 2014/0259993 A1 | 9/2014 | Hayes | |
| 2015/0233113 A1 * | 8/2015 | Ueno | E04B 1/98 52/167.1 |

FOREIGN PATENT DOCUMENTS

| | | |
|---|---|---|
| JP | 10-008767 A | 1/1998 |
| JP | 11-293948 A | 10/1999 |
| JP | 2001-254438 A | 9/2001 |

* cited by examiner

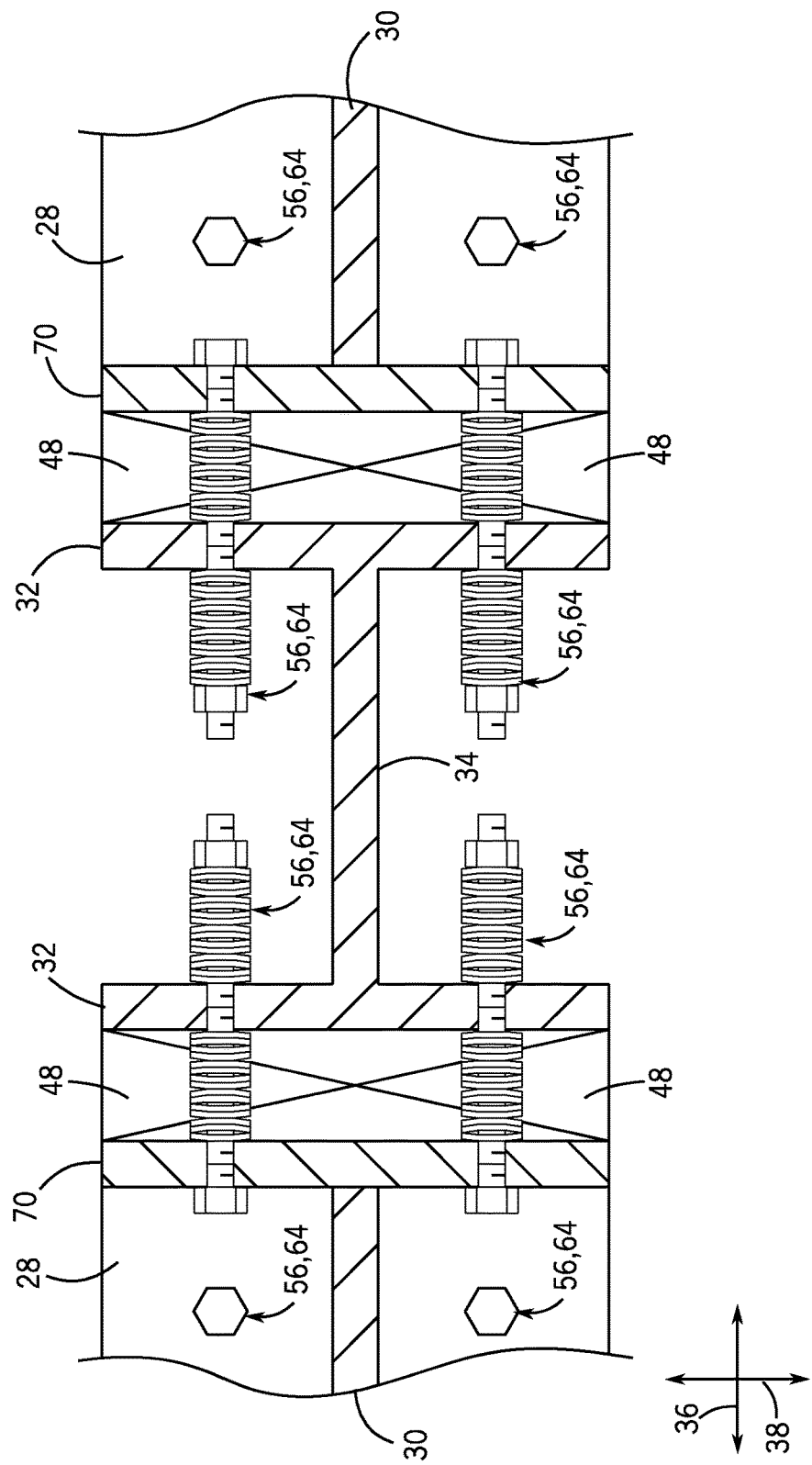

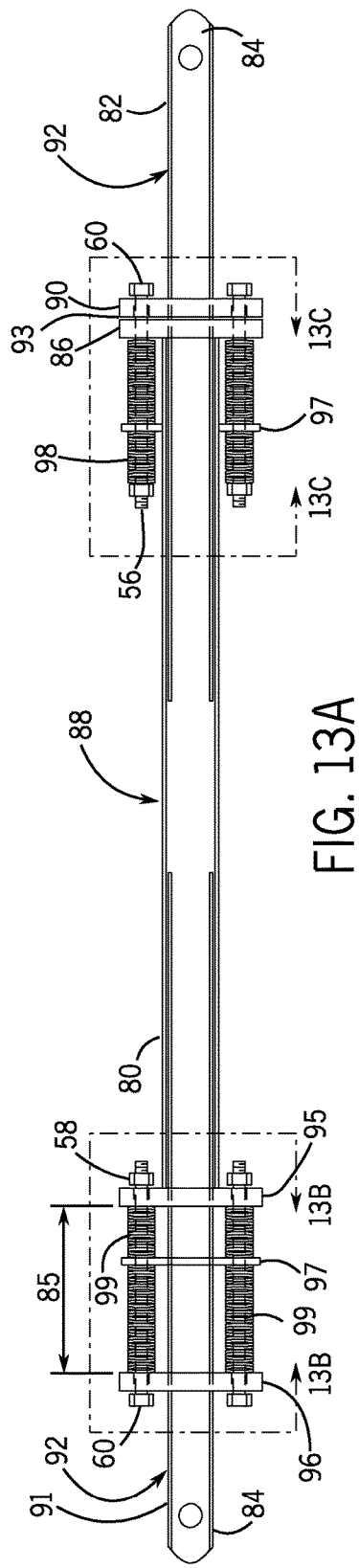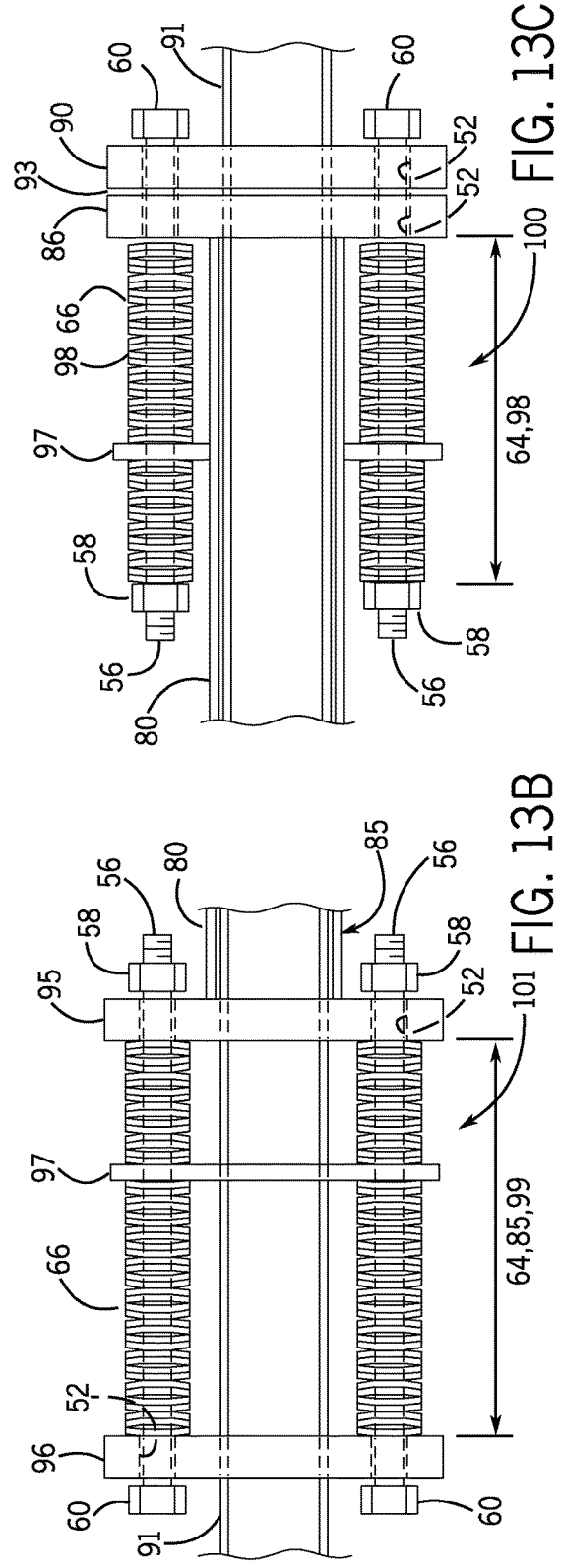

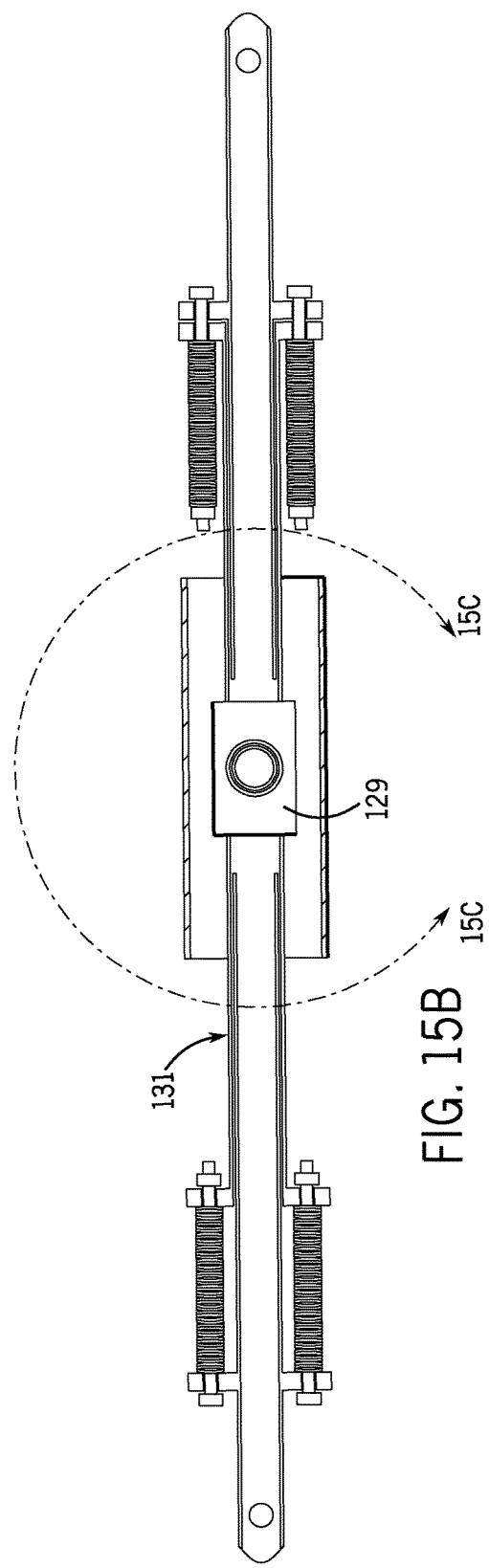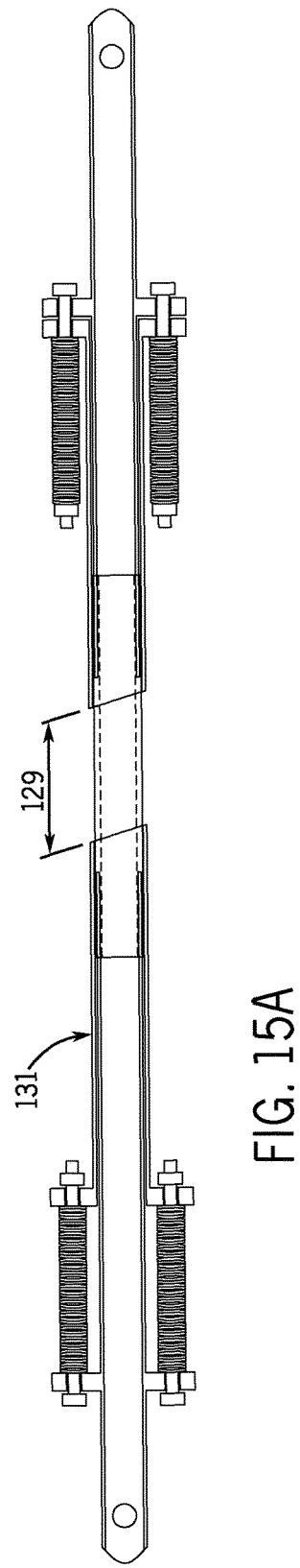

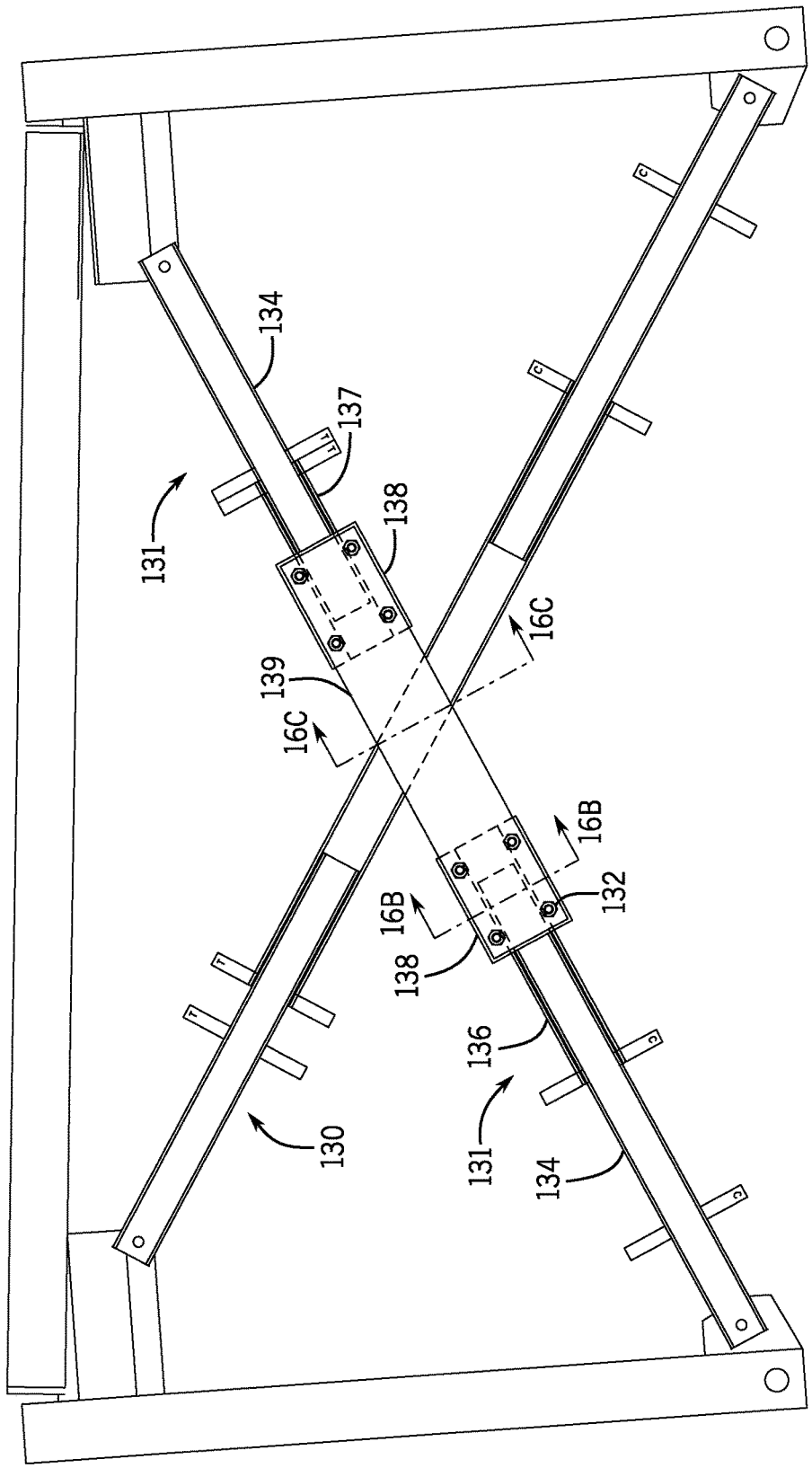

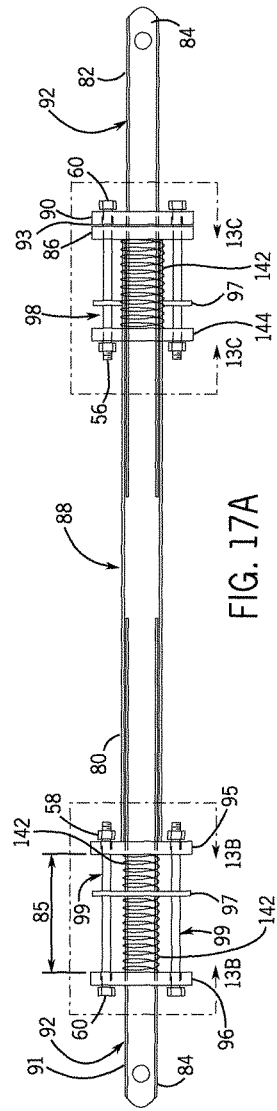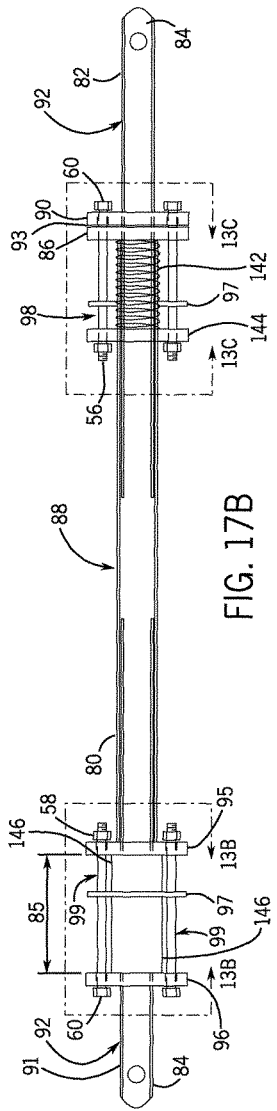

STRUCTURAL CONNECTION MECHANISMS FOR PROVIDING DISCONTINUOUS ELASTIC BEHAVIOR IN STRUCTURAL FRAMING SYSTEMS

CROSS-REFERENCE TO RELATED APPLICATION

The present application is a continuation-in-part of and claims priority to U.S. patent application Ser. No. 14/795,351 filed Jul. 9, 2015, which is a continuation of and claims priority to U.S. patent application Ser. No. 13/803,386 filed Mar. 14, 2013, now issued as U.S. Pat. No. 9,080,339, the disclosures of which are incorporated herein in their entirety.

BACKGROUND OF THE INVENTION

Embodiments of the invention relate generally to structural framing systems and, more particularly, to structural connection mechanisms that are included in a structural framing system (primary, secondary, or other), to provide and allow for discontinuous elastic behavior of such system(s) for load conditions where plastic ductile behavior of commonly used beams and connection mechanisms would otherwise be relied upon. The discontinuous elastic behavior as described herein is achieved by constructing one or more of the structural framing system's connections, e.g., a beam to column connection, in a manner that comprises a zone in the load path of the connection where the stress strain behavior is more elastic than the elastic modulus of the base materials from which the connection is constructed of if constructed as a rigid connection, would predict.

In areas prone to seismic loading events, structures such as buildings and bridges often include seismic force resistive systems integrated therein. These seismic force resistive systems attempt to protect the structure and control damage, loss of life and contents by mitigating the detrimental effects of forces associated with such loading events, such as by safely enhancing ductility and damping characteristics of the structure. One response of a structure to a seismic event is drift of the structure, i.e., lateral deflection. The amount of drift experienced by a structure for a given seismic load is, in part, determined by the stiffness of the structure, with drift being smaller for stiffer structures and larger for less stiff structures of equal mass.

The amount of drift allowed for a structure (i.e., drift limits) is prescribed by building codes and is dependent upon many things, generally including the type of forces imposing the drift, such as: seismic, wind, or other transient loads; building construction; use of the structure; finishes attached to or contained inside the structure; etc. Probability of occurrence, expected magnitude of load, and occupancy are given strong consideration as well. In structures where relatively large amounts of drift resulting from seismic events are deemed by building codes to be acceptable, it is often desirable to take maximum advantage of such allowance so as to reduce the required strength of the structure as compared to stiffer structures designed for less drift. A similar approach may be desirable relative to other transient loading conditions which result in horizontal or vertical deflections of structures. In the case of seismic loading, current codes allow drift that in many circumstances results in flexure of conventional rigid connections that exceeds the elastic limits of materials used to construct such conventional connections. To insure safety, the conventional method of achieving allowable drift for seismic loads therefore relies on the plastic ductile behavior of a designated portion of the structural frame whereat the strain will exceed the elastic limits, in a manner which is safe but predicted to cause damage to structural components.

Considerable prevalent existing technology achieves the allowable amount of drift resulting from seismic events through a "weak beam-strong column" philosophy where beam components in the structure exhibit elastic behavior at low levels of seismic loading, followed by inelastic plastic ductile behavior as seismic loading increases within the service load range, at a prescribed location near columns of beams with end moment resistance or at the intersection of a beam and chevron cross brace between floor diaphragms. In a weak beam-strong column structure, the columns are expected to perform in an elastic manner. In the weak beam-strong column philosophy, it is presumed that seismic events that load structural components, most notably beams and braces, beyond their elastic capacity, i.e. plastic inelastic behavior, will result in a structure that is misaligned, exhibiting deformed structural members following such an event. It is further presumed that such misalignment and deformation may be significant enough to render the building uninhabitable and in some cases unrepairable. That is, the plastic inelastic behavior of beams experienced at higher seismic loading may result in a condition where repair is not practical or economical following seismic events.

Another drawback to existing weak beam-strong column technology is that construction of systems employing the philosophy typically require field welding the connection of beams to columns, or of beams to beam stubs in the case of columns shop fabricated as "trees". Beams with large (thick) flanges are often required by the structural design. Compared to shop fabrication, the limitations of field welding of these large flanges (e.g., shortcomings of SMAW or FCAW processes, lack of heat treatment, more variable environmental conditions, etc.) leaves welds susceptible to flaws which can be controlled to a higher degree in a shop environment where: a) additional more advantageous welding processes may be employed; b) pre- and post-weld heat treatments may be used; c) environmental conditions that effect weld quality can be controlled; and d) positioning techniques employed. For example, the field welding of such flanges often occurs in outdoor job site environments at remote and elevated areas, with completing of the weld possibly taking several hours or more in damp, windy, cold conditions, such that moisture, pre-weld temperature of the weldment, interpass temperature, and ambient humidity may adversely affect consumables and the strength of the weld. Post-weld heat treatment of structural connections in the field, i.e., construction sites, is impractical and seldom performed, leaving no thorough remedy to residual stress in and around the weld zone induced by heating and cooling from the field welding process. Flaws most often associated with environmental conditions, access, and less than optimal positioning of the weld joint may also occur more frequently when field welding the beams to columns compared to shop welding, such as slag inclusions and lack of fusion which is sometimes found near the web in the lower flange of the beam where mechanized wire brushing and grinding is not feasible, visibility of the weld puddle is impaired, and inadequate overlapping of starts and stops tend to occur.

Another prior art mechanism for achieving ductile behavior, a variation of the strong beam-weak column approach, includes "fused" connections that take advantage of friction or plastic deformation or sacrificial components to provide the flexure necessary for achieving the allowable drift for seismic loading. That is, fused connections are intended to undergo plastic deformation, and/or friction modulated movement along faying surfaces or other (non-elastic) failure during a seismic event, allowing some form of permanent displacement or deformation of the connection as a result of a design level seismic event. While such fused connections may purport to have self-realignment properties, such self-realignment associated with the fused connections relies in fact primarily on the response of bracing and columns, and is achieved without the assistance of the connection.

Therefore, it would be desirable to provide a structure and associated seismic force resistive system that extends the elastic range of structural framing elements such that the allowable drift, more specifically the inter-story drift, i.e., incremental drift between adjacent floor levels, for a design seismic event, may be achieved without plastic deformation of beams, columns, or bracing. It would also be desirable for such seismic systems to enable self-realignment of the structure to its pre-seismic event orientation and save economical realignment in instances where design loads and allowable drift have been experienced or narrowly to moderately exceeded. It would be further desirable for such seismic systems to make economical use of fabrication advantages typically associated with controlled factory assembly and fabrication for critical heavy welds as compared to field assembly such as positioning, gas metal arc welding, submerged arc welding, normalizing, heat treatment and stress relief, and provide for greater use of bolted field connections in lieu of field welded connections, thereby reducing field man hours per connection and quality control requirements relative to field welded connections vs. shop welded connections. It would be still further desirable to provide a load distributing connection or a load directing connection capable of distributing or directing forces within a structure according to loading conditions and desired response.

BRIEF DESCRIPTION OF THE INVENTION

Embodiments of the invention are directed to a structure and associated seismic force resistive system that extends the elastic range of structural framing elements.

In accordance with one aspect of the invention, a structural frame for a building includes a plurality of vertically oriented columns configured to provide gravity and lateral load resisting support to the structural frame, a plurality of horizontally oriented beams coupled to the plurality of columns at a plurality of intersections, a plurality of beam-to-column connections configured to couple the plurality of vertically oriented columns to the plurality of horizontally oriented beams at the plurality of intersections, a plurality of braces positioned in frame bays formed by respective pairs of columns and beams each comprising a multi-piece brace having a plurality of brace portions, and a plurality of discontinuous elastic zone connections to couple the plurality of beams to the plurality of columns via the plurality of beam-to-column connections and/or to couple pieces of the multi-piece brace. Each of the plurality of discontinuous elastic zone connections comprises a plurality of connection mechanisms and a compression element positioned on each of the plurality of connection mechanisms and comprising single component or a plurality of deformable components in a parallel stack, a series stack, or a combination of parallel stacks and series stacks, wherein the compression element is configured to provide elasticity in the structural frame and dampen the effects of transient loads on the structural frame.

In accordance with another aspect of the invention, a structural frame for a building includes a plurality of vertically oriented columns configured to provide gravity and lateral load resisting support to the structural frame, a plurality of horizontally oriented beams coupled to the plurality of columns at a plurality of intersections, and a plurality of braces positioned in at least a portion of frame bays of the structural frame formed by respective pairs of columns and beams, each of the plurality of braces comprising a multi-piece brace having a plurality of brace portions. The structural frame also includes a plurality of discontinuous elastic zone connections to couple pieces of the multi-piece brace together, wherein each of the plurality of discontinuous elastic zone connections comprises a plurality of connection mechanisms to connect pieces of the multi-piece brace together and deformable members positioned on or adjacent the plurality of connection mechanisms to act in combination with the plurality of connection mechanisms so as to regulate movement of the pieces of the multi-piece brace relative to each other, the deformable members configured to provide elasticity and damping in the structural frame in response to transient loads and overloading applied to the structural frame.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIGS. 13A-13C are schematic diagrams of a structural brace included in the structural frame of FIGS. 1-4, including discontinuous elastic zone connections incorporated therein, according to an embodiment of the invention.

FIGS. 15A-15E are schematic diagrams of a structural brace included in the structural frame of FIGS. 1-4, including discontinuous elastic zone connections incorporated therein, according to another embodiment of the invention.

FIGS. 16A-16C' are schematic diagrams of a structural brace included in the structural frame of FIGS. 1-4, including discontinuous elastic zone connections incorporated therein, according to another embodiment of the invention.

FIGS. 17A and 17B are schematic diagrams of a structural brace included in the structural frame of FIGS. 1-4, including discontinuous elastic zone connections incorporated therein, according to another embodiment of the invention.

DETAILED DESCRIPTION

Figure 1:
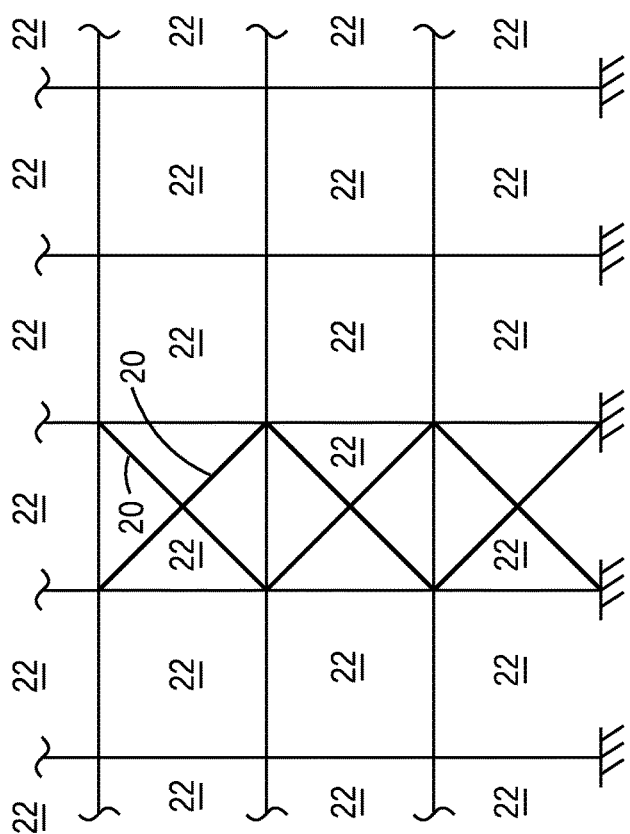
FIGS. 1-4 are schematic diagrams of portions of various structural frame configurations, according to embodiments of the invention.
Figure 2:
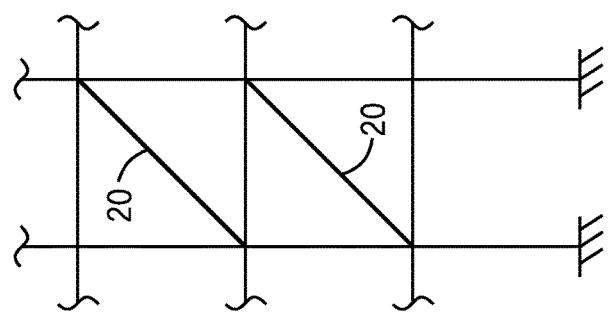
Figure 3:
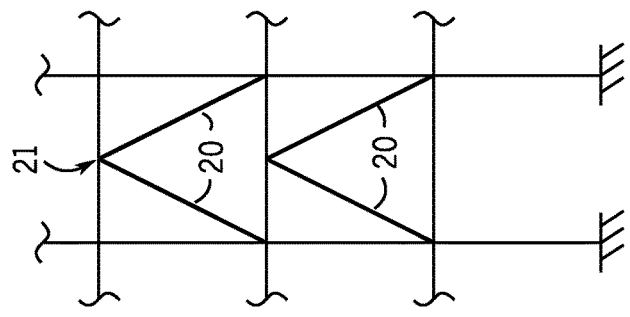

The operating environment of the invention is described with respect to a structural element, frame or framing system for a building or other structures subjected to transient loads, i.e., short term loading events including but not limited to seismic, wind, impact, machine, explosion, impulse, and moving loads. According to embodiments of the invention, such structural element, frame, or framing systems can occur and the invention can be implemented in architectural buildings, bridges, towers, mechanical process structures and other machine and mechanical designs to improve their response to various transient and non-transient loads; and otherwise protect structural frame components and systems from the adverse effects of overstress. Thus, embodiments of the invention are meant to encompass a variety of structural elements, structures and loading events applied thereto.

Referring to FIGS. 1-4, a structural frame 10 is schematically illustrated that incorporates embodiments of the invention. The structural frame 10 includes a plurality of columns 12, beams 14, and braces 20 that are configured to provide load resisting support to the structural frame 10. The columns 12 and beams 14 may thus be constructed having a steel I-beam type construction, for example, or have another suitable construction, such as being in the form of square/rectangular tube steel, round tube steel, and/or be formed of another suitable material, such as wood or concrete, or a combination of two or more of such materials. The structural frame 10 is anchored, i.e., connected to the ground, by way of column base plates 16, with the columns 12 and beams 14 in structural frame 10 being joined/coupled together at a plurality of intersection locations 18 in the structural frame 10. Based on the connection of beams 14 to columns 12 at the intersection locations 18, the beams 14 are thus positioned to define a plurality of floors, levels, or truss panels within the structural frame 10.

Figure 14:
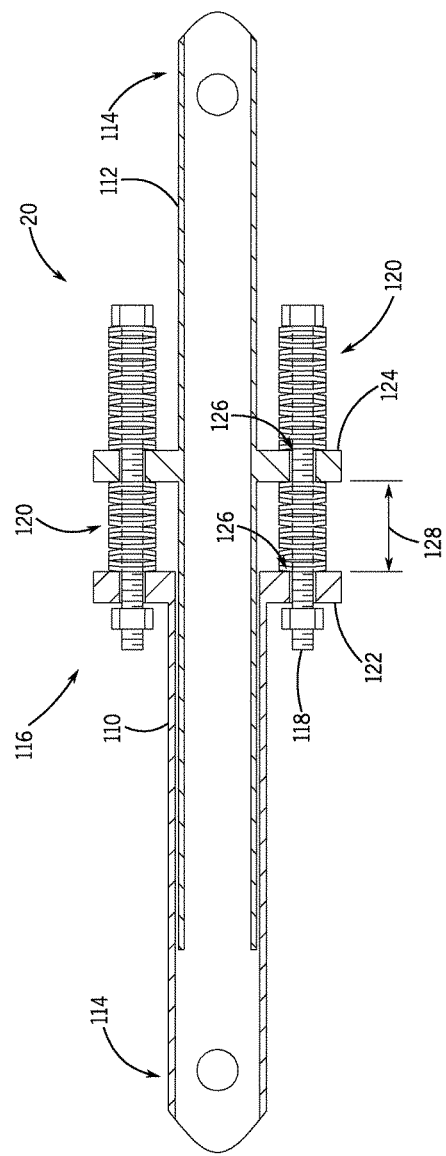
FIG. 14 is a schematic diagram of an adaptation of the structural brace of FIGS. 13A-13C that forms a damper which may be positioned in a manner similar to the braces included in the structural frame of FIGS. 1-4, or as a drag strut.

The structural frame 10 also includes braces 20 that are added to the structural frame 10 between each floor in the structure, with the braces 20 being arranged between selected pairs of columns and configured to assist in transferring horizontal loads collected in floor plates and other members to the anchorage of the structure, e.g., its foundation. As shown in FIG. 1, and alternative embodiments including but not limited to depictions in FIGS. 2, 3 and 4, one or more braces 20 capable of transferring horizontal loads applied to the frame to column anchorage points 16 of the frame are provided in each frame bay 22 that is defined by a respective pair of opposing columns 12 and beams 14, with the braces being connected at intersection locations 18 or at midpoints 21 of beams 14, based on the brace configuration/arrangement. According to embodiments of the invention, a singular diagonally oriented brace 20 could be positioned in a frame bay 22, e.g., FIG. 2, or a pair of braces 20, in either an inverted V-shape arrangement (i.e., Chevron arrangement), e.g., FIG. 3, or an X-brace arrangement, e.g., FIG. 1, could be positioned in a frame bay 22. Damper systems such as but not limited to viscous dampers common to the architectural, engineering, construction industry, and other general usage may be positioned in line or parallel to one or more brace(s) 20, or parallel to one or more beam (s) 20 where the bracing is in a chevron configuration. Components of brace 20 could/may also be configured as depicted in FIG. 14 to provide damping, as will be explained in greater detail later herein. The structural frame 10 depicted in FIGS. 1-4 is repeatable in a common plane with or without braces 20 to form a structural frame 10 of increased size in two dimensions. Additionally, the structural frame 10 is repeatable with or without braces 20 in a plane normal to (or at a lesser angle from) the frame shown in FIGS. 1-4 so as to form a three-dimensional structural frame, as will typically be found in building frame systems and other structural frame systems.

As shown in FIGS. 1-4 the structural frame 10 is designed and constructed so as to undergo various types of drift in response to transient loading events, with the drift, i.e., lateral deflections, identified as 24, in the structural frame 10. The drift depicted by structural frame 10 is a "mode 1" response where all lateral deflection occurs in one direction at any given time. Lateral deflection may also occur in multiple directions at a given time as is the case with a "mode 2" and higher response. When structural frames deflect in such multiple directions, a common response to seismic loading interstory drift—i.e., the drift of one story relative to the next—may be of equal or greater significance than the maximum drift of a single point of the structure. The amount of drift experienced by the structural frame 10 is, in part, determined by the mass of the structure, the stiffness of the structure, characteristics of the soil to which it is anchored, and characteristics of the load force(s) acting on it.

According to an exemplary embodiment, the structural frame 10 is designed to undergo a relatively large amount of drift and return to its original orientation without plastic deformation. As such, structural frame 10 is designed to have a high level of elasticity with respect to drift. For example, in the case of seismic loading, the often applied allowable interstory drift in the range of 1 to 2% of the story height is allowed to occur in a safe manner without collapse of structural and non-structural components. The allowable interstory drift is in essence a boundary used to optimize stiffness, mass, strength and stability of a structure. Elastic behavior followed by inelastic-plastic behavior of a weak beam-strong column system and main force resisting system is often relied upon to safely achieve this allowable drift. In doing so, maintaining stability of the structure is achieved but often at the cost of permanent damage to the structure, as the limit state intended to correspond to design seismic events are reached or exceeded. The cause of exceeding such elastic limit state is often the random nature of seismic events. Variability in construction materials such as the elastic limit of steel, and assembly of such materials, e.g., welding processes, contribute to prematurely exceeding the elastic limit state independent of the random nature of seismic events. Inelastic plastic behavior at carefully selected locations of beams and braces is relied upon to relieve stress in other portions of the structure where inelastic plastic behavior or fracture would cause an unacceptable degree of instability in the structure. Alternatively, by connecting beams of ideal strength and stiffness to columns with connections designed and adjusted to respond elastically prior to reaching the limit state of the beam's elastic range characterized by additional flexure in a rotational manner, overload which would initiate inelastic plastic behavior in such beams and subsequent damage thereof is avoided. In a similar way, overload in bracing systems may be controlled by adding connections designed and adjusted to respond elastically prior to reaching the limit state of the brace's elastic range characterized by additional flexure in an axial manner, overload which would initiate inelastic plastic behavior in such braces and subsequent damage thereof is avoided. The elastic behavior also provides assistance in restoring the frame 10 to its pre-seismic event orientation. In this way, a portion of the extended range of flexure associated with drift, usually achieved with inelastic plastic behavior, may be achieved in a more reliable and elastic manner, without damage to frame 10. Unlike inelastic plastic behavior, elastic behavior provides self-righting or similar realignment as an additional benefit.

According to embodiments of the invention, a series of connection mechanisms/components are provided in the structural frame 10 at specified locations in order to provide increased elasticity in the structural frame 10. These connection mechanisms are termed here below as "discontinuous elastic zone connections" and are structural connections designed/constructed so as to be suitable for transient load events and redistribution of overloading or infrequently encountered load combinations. The discontinuous elastic zone connections are positioned along the load path of beams, braces, and struts of the structural frame, with the discontinuous elastic zones occurring within each connection at and/or between faying surfaces or similarly positioned plates or flanges; the discontinuous elastic zone being further defined as a plane, combination of planes, or other discrete, mathematically or graphically definable two dimensional or three dimensional, bounded region through which the load path between two structural members (e.g., columns, beams, components of a brace, etc.) passes, with or without a medium or interstitial material between such faying surfaces, where the structure will under elevated loading conditions behave elastically without proportionate corresponding deformation of the faying surfaces or members they are attached to. The discontinuous elastic zone connection characteristically provides an increased level of elastic behavior along or within or between such faying or similar mating surfaces of the discontinuous elastic zone connection as compared to the remaining portion of the discontinuous elastic zone connection and structural member material on either side of the discontinuous elastic zone connection and, as compared to the condition where such faying or similar mating surfaces are rigidly welded or bolted to each other in a common manner where the elasticity of the connection is essentially the same as the members which they attach. Thus, as compared to such "rigid" connections (i.e., fully restrained or full moment connections, wherein rotation of a beam is restrained relative to a column at the point of connection to the column, and plastic behavior of the beam is relied upon, for example), the discontinuous elastic zone connection beneficially provides an increased level of elastic behavior to structural frame members and systems.

In general, each discontinuous elastic zone connection includes one or more of a fastening device, compression element(s), a shear restraint, and stabilizing elements. The fastening device includes fasteners (e.g., bolts, screws, rivets, rods, cables) that connect structural members of the frame on opposite sides of a discontinuous elastic zone. The compression element is a spring-like component that acts in combination with the fastening device to regulate the behavior of the connection resulting from forces applied by structural members on opposing sides of the discontinuous elastic zone. The shear restraint acts as a means of transferring or restraining shear between opposing sides of the discontinuous elastic zone and as a reaction point for the force provided by the fastening device and compression elements. The stabilizing elements maintain alignment of connected components and act as a means of transferring or restraining shear transverse to the beam or brace and accomplish one or more of the following functions: stabilizing the discontinuous elastic zone connection, preventing misalignment, and/or preventing application of shear forces to the fastening device, or limiting or controlling shear forces applied to the fastening device.

With particular regard to the compression elements, it is envisioned that the compression element(s) may be comprised of one or more of a variety of materials such as but not limited to metals, plastics, rubber, etc. Additionally, the shape of such compression elements may be one, a plurality, or a combination of shapes, including conical, cylindrical, helical, spiral, flat sheet, solid block, sleeve, etc. When placed as an interstitial element within the discontinuous elastic zone, or other position that controls or regulates the discontinuous elastic zone, a compression element can cause, contribute, and/or assist in achieving the desired elasticity of the subject connection, be it associated with a beam, column, brace, drag strut, shear wall/diaphragm component, or other tension or compression element of a structure or support system.

According to one embodiment, and as explained in greater detail below, a discontinuous elastic zone connection can be implemented for a beam 14 and column 12 (FIGS. 1-4) moment connection. In such a connection, fasteners/bolts working in combination with compression elements span the discontinuous elastic zone to provide clamping forces in a manner later described herein, that allows the connection to behave as a rigid connection until a predetermined load on the connection is reached, at which point angular separation between faying surfaces occurs in an elastic manner such that the faying surfaces will realign themselves and again cause the connection to behave as a rigid connection when the load applied to the connection falls below the predetermined load. The predetermined load is directly related to the geometry of the connection compression element characteristics and preload applied to the compression elements by fastening devices. When this separation occurs in the angular manner described, or in a parallel manner as is the case for some embodiments such as braces and struts described later herein, the region or zone which expands and contracts provides a discontinuity in the elastic behavior of the connection and structural system compared to the condition where the connection was rigidly connected, e.g., a welded or bolted full moment connection with no compression element or other spring mechanism. The predetermined load and characteristics of the discontinuity can be selected and manipulated to satisfy the requirement of providing minimal deflection under daily service loads in the case of frame structures, or static loads in the case of machines; and elastic behavior with potential for damping when subjected to overloads, transient loads, and less frequent or rare dynamic loads. In the case of frame structures, horizontal loads below such predetermined load cause deflection, i.e., drift 24, to occur according to the elastic behavior of beam, column and brace members of the structural frame 10 with the connections between column 12 and beam 14 behaving as rigid, semi rigid, or partially restrained connections. Additional load beyond the predetermined load will cause drift 24 to increase according to the elastic behavior of the beams, columns braces and the discontinuous elastic zone connections. In one embodiment, the column to beam moment connection, components bounding the discontinuous elastic zone, e.g., faying surfaces, or plates within the connection together with shear restraint and stabilizing elements are configured to allow hinge action between the beam and column which is regulated by the fastening devices and compression elements.

Figure 15C:
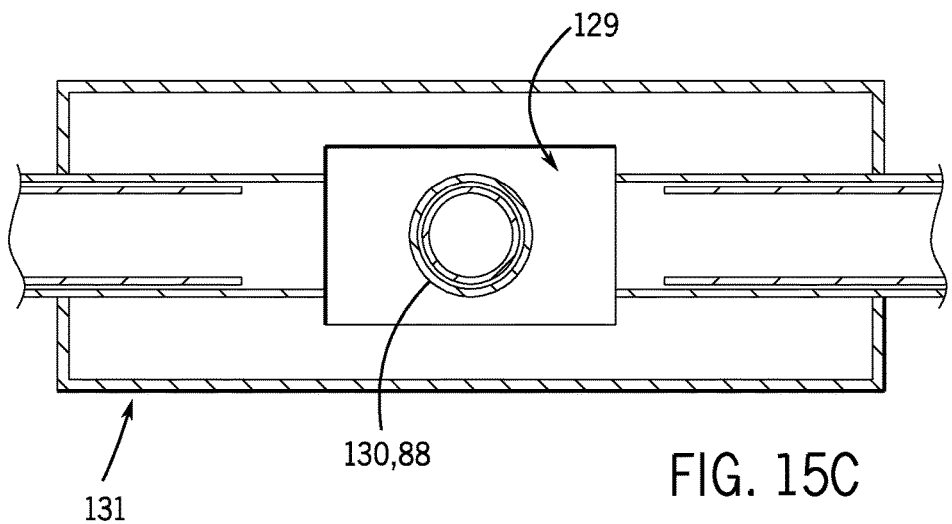
Figures 15D, 15E:
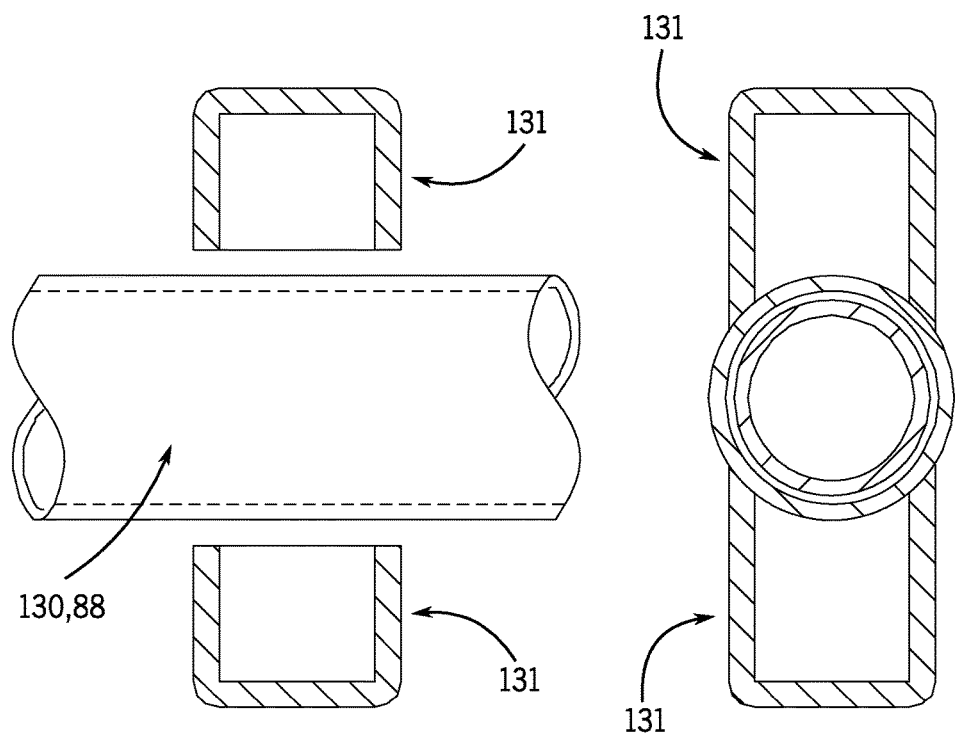

According to another embodiment previously introduced, and as explained in greater detail below in FIGS. 13 and 15, discontinuous elastic zone connections can be implemented for a column, brace (e.g., brace 20) or drag strut, acting in compression, tension or both. For this embodiment, two discontinuous elastic zone connections are employed: one with a compressive element located within the discontinuous elastic zone; and one with the compressive element located outside the discontinuous elastic zone. In such a brace, the connection having the compressive element located within the discontinuous elastic zone contracts when the brace is loaded in compression beyond the preload force applied by its connection devices. By contrast, when the brace is subject to tension, the connection having the compressive element located outside the discontinuous elastic zone expands when the brace is loaded beyond the preload force applied by its fastening devices. By reducing the brace of FIGS. 13 and 15 to a single discontinuous elastic zone connection where the compressive element is located within the discontinuous elastic zone, and adding additional compressive elements opposite one of the flanges bounding that discontinuous elastic zone, a brace or drag strut with characteristics akin to an oscillating spring may be constructed, as shown in FIG. 14.

Figure 5:
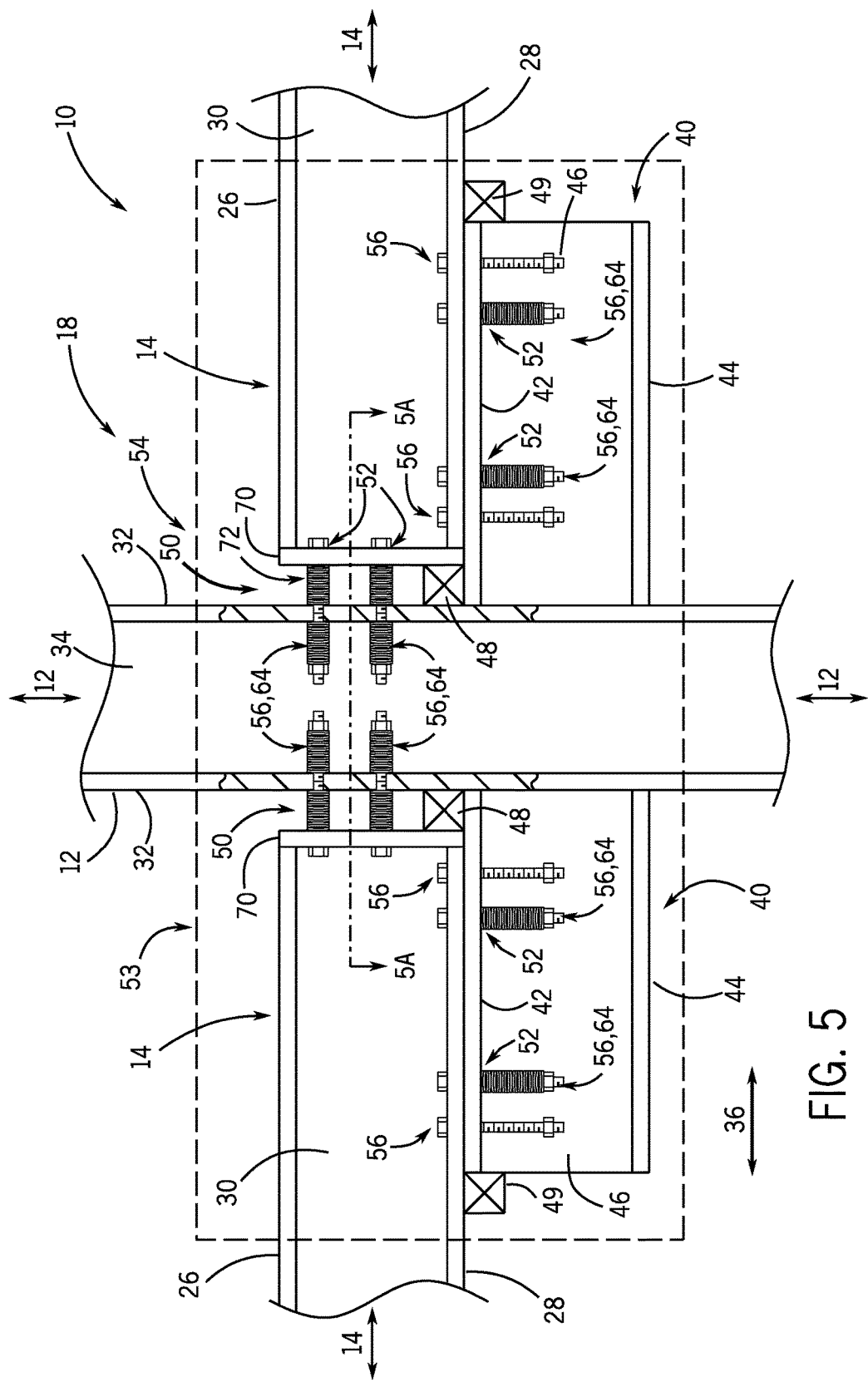
FIGS. 5-5E are detailed views of an interconnection location in the structural frame of FIGS. 1-4 and discontinuous elastic zone connection located thereat, according to an embodiment of the invention.

Referring now to FIGS. 5 and 5A, an intersection location 18 of a column 12 and beams 14 (with or without a brace 20) in structural frame 10 is shown in greater detail, with a discontinuous elastic zone connection being implemented at location 18 and in what is termed a discontinuous elastic zone 53, according to an embodiment of the invention. As shown in FIGS. 5 AND 5A, each of column 12 and beams 14 is in the form of a steel "wide flange beam" similar to an "I-beam" type section having desired dimensions. Each beam 14 includes a top flange 26 and a bottom flange 28 joined together by a web 30 and, similarly, column 12 includes a pair of flanges 32 joined by a web 34. As shown in FIGS. 5 AND 5A, the beams 14 are aligned with column 12 along a strong orientation 36, with an end of each beam 14 being positioned adjacent a flange 32 of column 12. While shown as positioned along the strong orientation 36 of column 12, it is also recognized that beams 14 may be aligned with column 12 along its weak orientation 38 that is perpendicular to its strong orientation 36, as explained in greater detail below and with FIG. 9. At the intersection location 18, beam-to-column connections 40 are joined to the column 12 and to beams 14. According to one embodiment, the beam-to-column connections 40 include short lengths of beam "stubs" that are welded to column 12 in a manner similar to a haunch, although it is recognized that other forms or configurations of haunches, corbels, seated connection bearing surfaces, or brackets could be used for securing the column 12 to beams 14. According to one embodiment, the column 12 is shop fabricated as a "tree" with the beam stubs 40 formed thereon in the shop, such that no welding of the stubs 40 to the column 12 need be performed in the field. The beam stubs 40 have a similar construction to beams 14, having a wide flange beam construction with a top flange 42 and a bottom flange 44 joined together by a web 46 and other additional web stiffeners doublers, and or end plates as necessary to meet load requirements and provide attachment for bracing.

In an exemplary embodiment, each beam 14 is positioned on top of a respective beam stub 40 near the intersection location 18 and is spaced apart from column 12 with a shear restraint block 48 affixed (e.g., welded) to the beam stub 40 and column 12, and with the shear restraint block 48 functioning to space the column 12 from the beam 14 by a specified distance/gap 50 that allows for rotation/tilting of the beam 14 during a loading event, as will be explained further below. According to one embodiment, a shear restraint block 49 is also affixed (e.g., welded) to the beam 14 adjacent the end of beam stub 40 and is used to provide shear restraint in a manner analogous to shear restraint block 48, or otherwise serve to maintain the distance/gap 50. While FIG. 5 shows shear blocks 48 and 49 included in structural frame 10 in the shape and at the positions illustrated, it is recognized that the shear blocks 48 and 49 may be shaped differently or omitted from the structural frame, as a designer may determine them to be necessary in some instances and not necessary in other instances.

As shown in FIGS. 5 AND 5A, for each beam 14, a plurality of bolt holes 52 are formed on the bottom flange 28 on each side of the web 30, and the beam 14 is positioned on beam stub 40 such that the bolt holes 52 formed in bottom flange 28 are aligned with bolt holes 52 formed on top flange 42 of the beam stub 40. While two bolt holes 52 are shown as being formed on bottom flange 28 of beam 14 on each side of web 30, along with two bolt holes 52 being formed on top flange 42 of beam stub 40 on each side of beam stub web 46, it is recognized that a greater number of bolt holes 52 could be formed in the respective bottom and top flanges of the beam and beam stub 40 (e.g., four or more bolt holes). A series of connection mechanisms/components that collectively form a discontinuous elastic zone connection, generally indicated as 54 in FIGS. 5 AND 5A, are also provided in the structural frame 10 at specified locations, i.e., at discontinuous elastic zones occurring within each connection at and/or between faying surfaces or similarly positioned plates or flanges. The discontinuous elastic zone connection 54 is designed/constructed so as to be suitable for transient load events and infrequently encountered load combinations and provide an increased level of elastic behavior along or within or between such faying or similar mating surfaces of the discontinuous elastic zone connection 54 as compared to the remaining portion of the discontinuous elastic zone connection and structural member material on either side of the discontinuous elastic zone connection 54 and, as compared to the condition where such faying or similar mating surfaces are rigidly welded or bolted to each other in a common manner where the elasticity of the connection is essentially the same as the members which they attach, thus beneficially providing an increased level of elastic behavior to structural frame members and systems.

Figure 6:
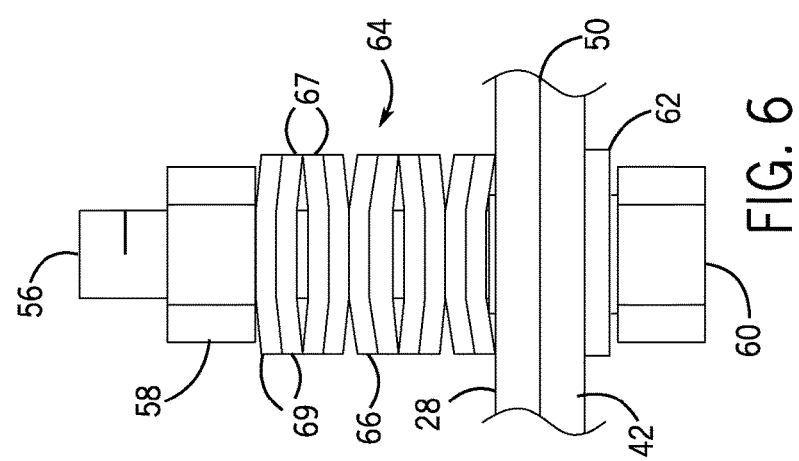

Referring now to FIG. 6, and with continued reference to FIGS. 5 AND 5A, a fastening device-compression element assembly for coupling faying surfaces without a compression element in the interstitial space of the discontinuous elastic zone, e.g., between the faying surfaces of beams 14 to beam stubs 40, is shown in greater detail, for use as part of a discontinuous elastic zone connection 54. The fastening device 56 is positioned so as to extend through bolt holes 52 formed in beam 14 and beam stub 40, to join the beam 14 to the beam stub 40. According to the embodiment of FIG. 6, the fastening device 56 is in the form of a bolt, although it is recognized that other types of fasteners could be used, such as screws or rivets, for example. The bolt 56 includes a nut 58 positioned thereon on an end opposite the head 60 of the bolt 56 to provide for securing of beam 14 to beam stub 40. The requirement for plate washers 62, and similarly flat washers, and wedge washers, is to be determined by pattern and practice standards applicable for materials used, bolt hole configuration, loads, and requirements of remaining elements in the discontinuous elastic zone connection 54.

Figure 7:
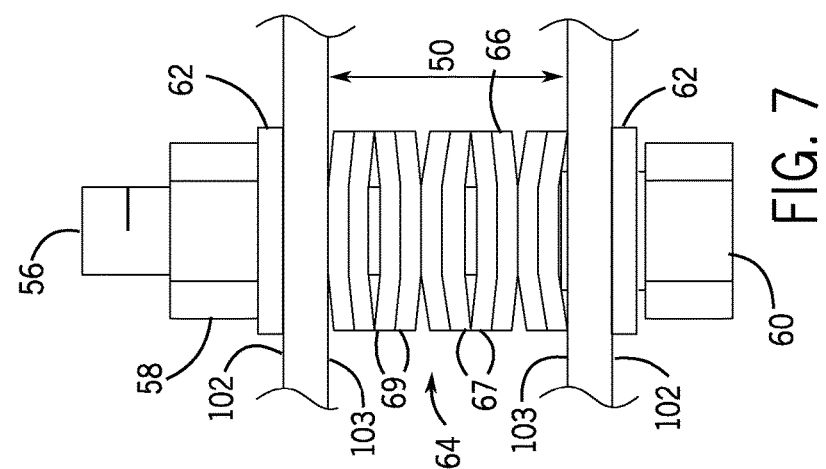

Referring now to FIG. 7, with continued reference to FIGS. 5, 5A and 6, and also with reference to FIGS. 13 and 14, a compression element 64 (i.e., spring assembly) is shown positioned on bolt 56 between bolt head 60 and nut 58 on the side of 28 and/or 42 opposite the faying surface between them 102 that is configured to provide elasticity to regulate movement between faying surfaces 103 on either side of the discontinuous elastic zone of connection 54. According to an exemplary embodiment, the compression element 64 is composed of a plurality of deformable, replaceable components 66 in a stacked arrangement, such as or similar to stack 68. According to an exemplary embodiment of the invention, the deformable, replaceable components 66 of compression element 64 are Belleville washers 66 (i.e., coned-disc springs, conical spring washers) having a frusto-conical shape that gives the washer a spring characteristic. The Belleville washers 66 can be formed of any number of suitable materials and be designed to have a desired thickness and diameter, with the exact construction/configuration of the washers 66 being designed to meet the requirements of the structural frame 10 and based on the anticipated loads that the frame will be subjected to. Thus, a fastening device-compression element assembly for coupling faying surfaces without a compression element in the interstitial space of the discontinuous elastic zone, as described and depicted in FIG. 6 provides discontinuous elastic behavior where forces act to move faying surfaces 103 away from each other, i.e., a tension condition. In contrast, the assembly shown in FIG. 6 may be modified by locating compression element 64 between faying surfaces 103, as an interstitial element as depicted in FIG. 7, thus providing discontinuous elastic behavior where forces act to move faying surfaces 103 toward each other, i.e., a compression condition. Utilization of the assemblies as depicted in FIGS. 6 and 7, in brace 20 (as further described in FIGS. 13 and 15) will—with appropriate pretension applied via bolt and nut assembly 60 and 58—provide discontinuous elastic behavior for both a compression and tension condition. The combination of the fastening device depicted in FIG. 6 and FIG. 7 in the manner depicted in FIG. 8 and FIG. 14, will provide discontinuous elastic behavior in an oscillating manner where a tension condition and a compression condition are alternately applied to structural element positioned within, and attached to, a structural frame for the primary purpose of providing damping.

In addition to the construction of each Belleville washer 66 (i.e., materials, thickness, diameter) being selected, the arrangement and orientation (e.g., 67, 69 or a combination, or a variation of 67 and/or 69) of the washers 66 in the washer stack 68 that forms compression element 64 can also be selected and controlled. That is, the arrangement and orientation of the Belleville washers 66 in the stack 68 may be controlled in order to modify the spring constant or amount of deflection provided by compression element 64, and where desirable, allow for varying the spring constant with deflection. Stacking in the same direction will add the spring constant in parallel, creating a stiffer compression element 64 (with the same deflection). Stacking in an alternating direction is the same as adding springs in series, resulting in a lower spring constant and greater deflection. Mixing and matching the orientations/directions of the Belleville washers 66 thus allows each of the compression elements 64 of discontinuous elastic zone connection 54 to be designed to have a single or variable spring constant(s) and deflection capacity which will in turn allow frame 10 to be designed with a highly diverse range of drift and deflection characteristics.

In a parallel stack, hysteresis (load losses) will occur due to friction between the washers 66. The hysteresis losses can be advantageous because of the added damping and dissipation of vibration energy. This loss due to friction can be calculated using hysteresis methods. Ideally, no more than four washers 66 should be placed in parallel, i.e. 69. If a greater load is required, then the factor of safety must be increased in order to compensate for loss of load due to friction. Friction loss is not as much of an issue in series stacks 67. In a series stack 67 of washers 66, the deflection is not exactly proportional to the number of washers. This is because of a bottoming out effect when the washers 66 is series 67 are compressed to flat. The contact surface area increases once the washer 66 is deflected beyond 95%. This decreases the moment arm and the washers 66 in series 67 will offer a greater spring resistance. Hysteresis can be used to calculate predicted deflections in a series stack 67.

The inclusion of a single Belleville washer 66 or a plurality of Belleville washers in compression element 64 thus beneficially provides for designing a compression element 64 to have a desired specific or variable spring constant and deflection capacity and to provide a connection with the desired elasticity, with such properties being easily adjustable by changing the construction and configuration of the washers 66 in compression element 64. Different sized washers 66 can be swapped in and out of the washer stack 68 and the washers 66 can be configured/arranged differently e.g., series 67, parallel 69, or variations thereof, to form a washer stack 68 or variation thereof, to achieve essentially infinite tunability of spring rate while requiring only a limited number of washer types and sizes. The spring rate of a stack 68 of identical Belleville washers 66, designed to provide a single spring constant, can be quickly approximated, counting from one end of the stack 68 and grouping by the number of adjacent washers 66 in parallel 69. The total spring coefficient of the compression element 64 is set forth as:

$$K = \frac{k}{\sum_{i=1}^{g} \frac{1}{n_i}}, \quad [\text{Eqn. 1}]$$

where $n_i$ is the number of washers 66 in the ith group, g is the number of groups, and k is the spring constant of one washer 66. Arrangements of Belleville washers resulting in multiple spring constants may be devised to customize the flexural characteristics of a connection and the frame utilizing it.

Referring again back to FIGS. 5 AND 5A, the discontinuous elastic zone connection 54 also is configured to provide for coupling of beams 14 to columns 12. To provide for use of the discontinuous elastic zone connection 54 in coupling beams 14 to columns 12, an end plate 70 is affixed (e.g., welded) to the end of each beam 14, so as to form a surface parallel to flange 32 on column 12 or a plate spanning the column flanges 32. The end plates 70 each include a plurality of bolt holes 52 formed therein. In the embodiment shown in FIGS. 5 AND 5A, four bolt holes 52 are formed in each end plate 70, with a pair of vertically aligned bolt holes 52 being generally positioned on opposing sides of web 30 of beam 14, although it is recognized that a greater number of bolt holes 52 could be provided. The bolt holes 52 formed in end plate 70 correspond to a matching number of bolt holes 52 formed in flange 32 of column 12. The bolt holes 52 formed in end plate 70 being are aligned with the bolt holes 52 formed in the column flange 32.

Figure 8:
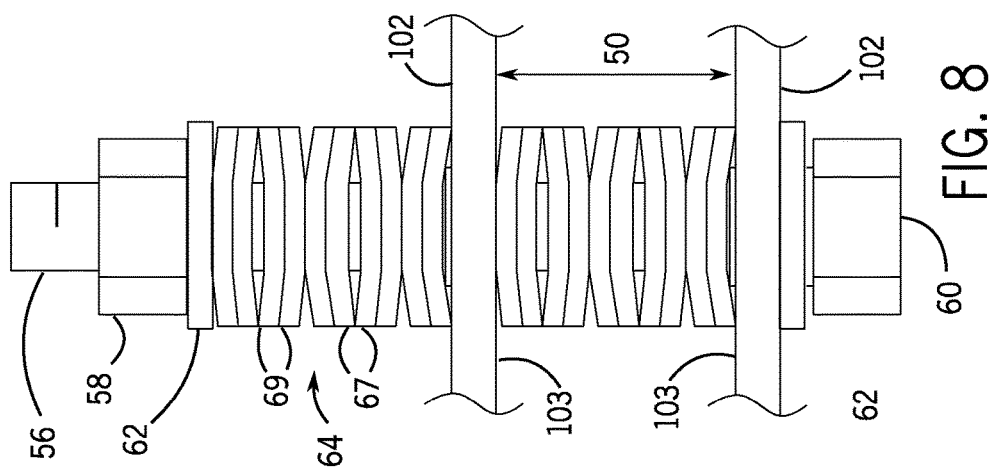
FIGS. 6-8 are schematic diagrams of a fastening device and compression element for use in the discontinuous elastic zone connection of FIGS. 5 and 5A, according to an embodiment of the invention.

The fastening devices and compression elements, e.g. bolts, nuts and Belleville washers, of discontinuous elastic zone connection 54 that couple beams 14 to columns 12 may be of similar construction to the components provided for coupling the beams 14 and beam stubs 40 except that the compression element, e.g., Belleville washers, are used as an interstitial element, i.e., FIG. 7, in addition to a non-interstitial element, i.e., FIG. 6. Thus, fastening devices 56 and compression elements 64 having a construction as shown in FIG. 8 are provided and are configured to provide damping in the structural frame 10, or isolation of a non-structural component from the structural frame 10. The exact construction of fastening devices 56 and compression elements 64 for coupling the beams 14 and column 12 can be varied, with the construction of each Belleville washer 66 (i.e., materials, thickness, diameter) included in each compression element 64 being selected, as well as the arrangement and orientation of the washers 66 (series 67 vs. parallel 69) in the washer stack 68 that forms each compression elements 64.

As shown in FIGS. 5 AND 5A, according to one embodiment of the invention, a stack of Belleville washers 68 is positioned in the gap 50 between the end plate 70 and the flange 32 of column 12 and forms a compression element within the interstitial space of the discontinuous elastic zone connection 54. According to an exemplary embodiment, the fastening devices 56 (i.e., bolts) that couple the beam 14 to the column 12 are thru-bolted from the end plate 70 to the column flange 32, through the Belleville washers 72.

Figure 9:
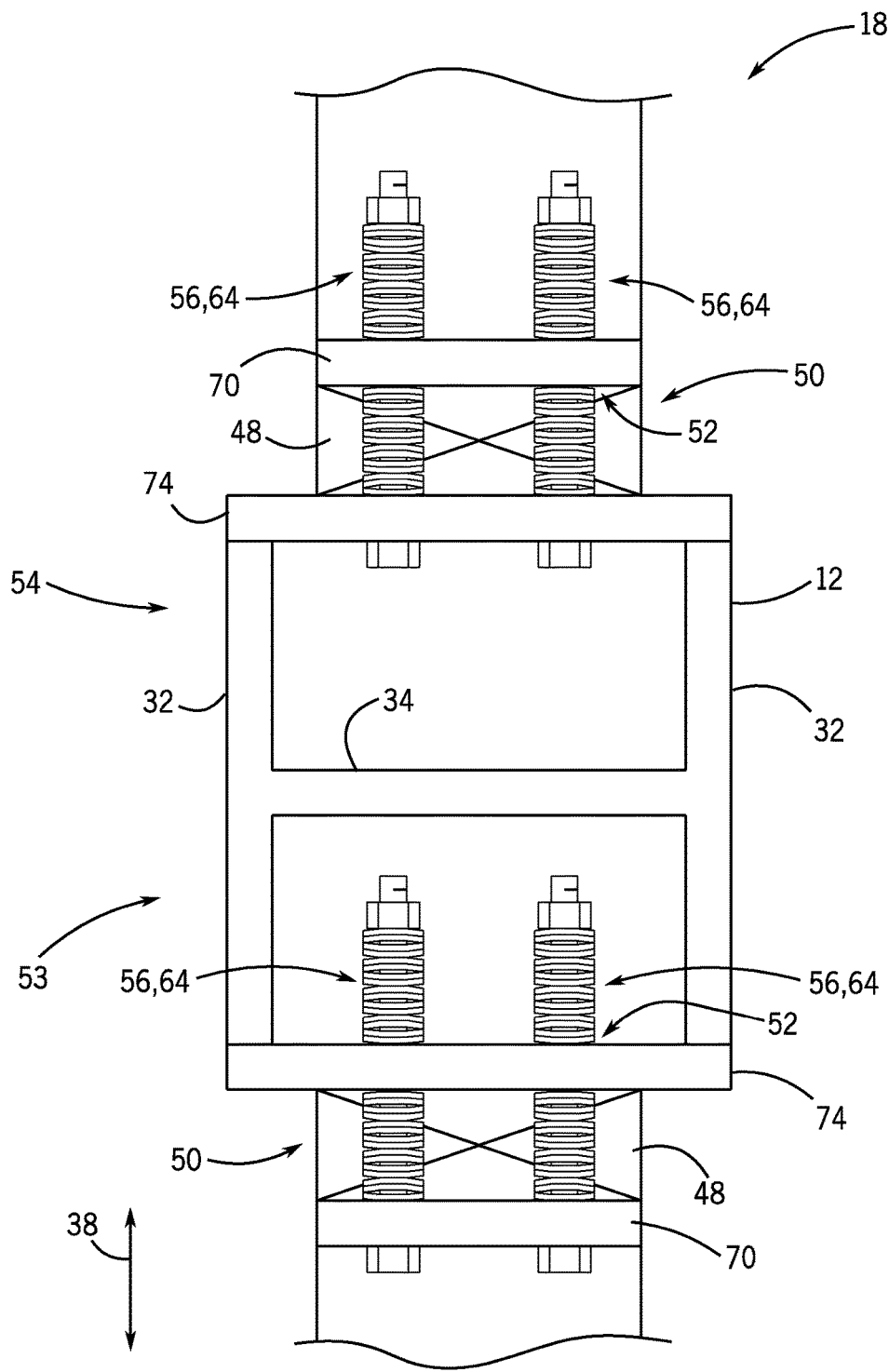
FIG. 9 is a top view of an interconnection location in the structural frame of FIGS. 1-4 and the discontinuous elastic zone connection located thereat, according to another embodiment of the invention.

While the intersection location 18 shown in FIGS. 5 AND 5A illustrates the coupling of the beams 14 with column 12 along a strong orientation 36 (i.e., with an end of each beam being positioned adjacent a flange of column), it is recognized that beams 14 may be aligned with column 12 along a weak orientation 38 that is perpendicular to strong orientation 36. According to one embodiment of the invention, and as shown in FIG. 9, when beams 14 are coupled to column 12 along the weak orientation 38, a plate 74 is welded to column 12 to provide for coupling of beam stubs 40 and beam 14 thereto. When beam 14 is coupled to column 12 by way of the fastening devices 56 (i.e., bolts) and compression elements 64 (i.e., stacks of Belleville washers 66), bolt holes 52 are formed in plate 74 on column 12 that correspond to the end plate 70 affixed to beam 14. The fastening devices 56 that couple the beam 14 to the column 12 are thru-bolted from the end plate 70 to the plate 74 on column 12 and, according to one embodiment, also extend through Belleville washers or other compression elements, positioned in the gap 50 between beam 14 and column 12. It is also envisioned that, when coupling beam 14 to column 12 along the weak orientation 38, fastening devices 56 may be secured to the web 34 of column 12 rather than a separate plate 74 that is affixed to the column 12. In such an embodiment, the fastening devices 56 would extend from the end plate 70 on beam 14 to the web 34 of column 12. Web stiffeners or doublers may be added to web 34 as load conditions require. In another embodiment, the fastening devices 56 would extend from the end plate 70 on beam 14 through the web 34 of column 12 to end plate 70 on beam 14 on the opposite side of column 12.

Figure 10:
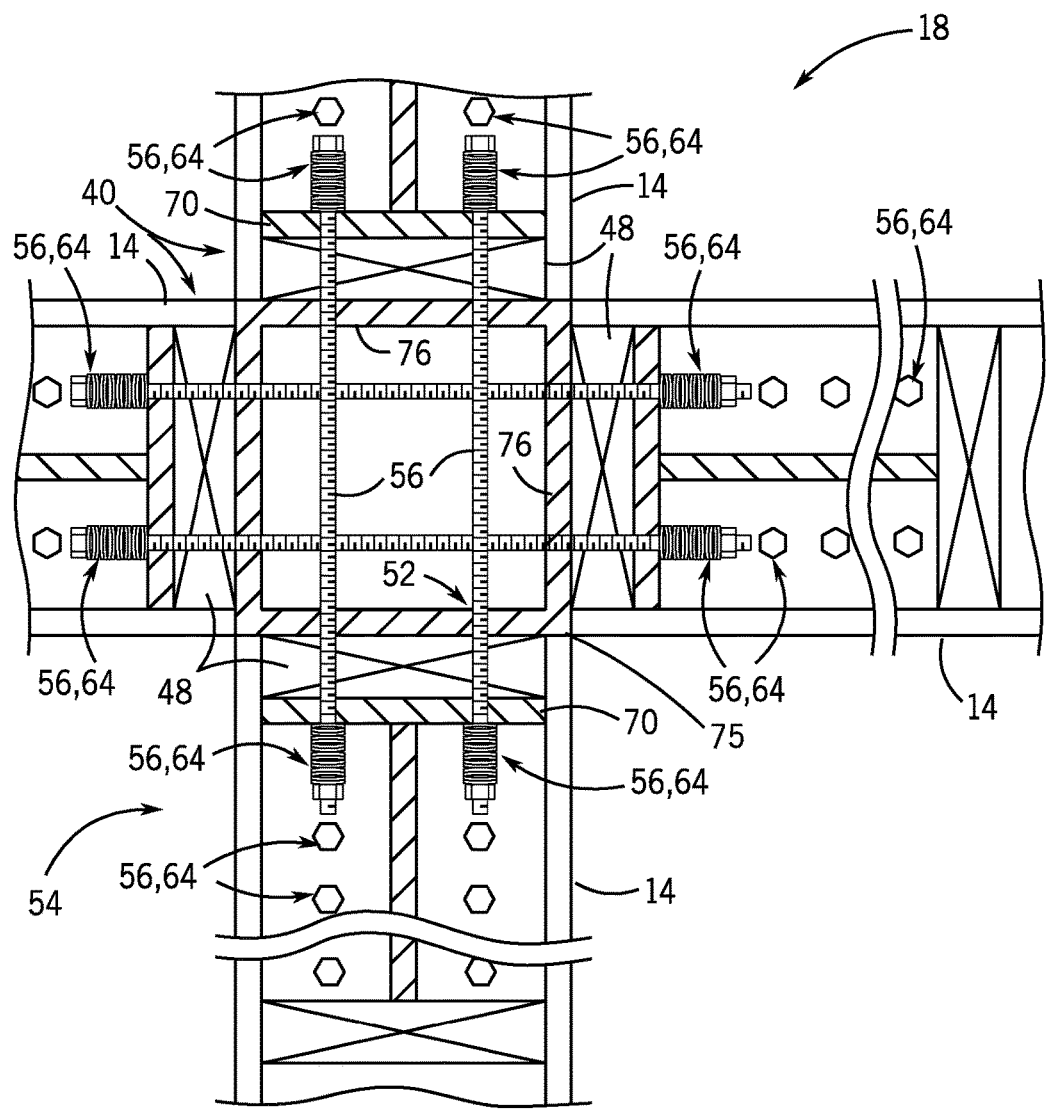
FIG. 10 is a top view of an interconnection location in the structural frame of FIGS. 1-4 and the discontinuous elastic zone connection located thereat, according to another embodiment of the invention.

Referring now to FIG. 10, coupling of wide flange beams 14 to a square tube steel column 75 along each of a strong orientation 36 and weak orientation 38 is shown, according to another embodiment of the invention. While tube steel column 75 is shown as having a square construction, where the column orientation is equal in both directions it is recognized that the column 75 could instead have a circular construction, rectangular construction, or other construction, with or without a strong vs. weak orientation according to additional embodiments of the invention. For accommodating coupling of beams 14 to tube column 75 along each of strong orientation and weak orientation 38 as part of the discontinuous elastic zone connection 54, bolt holes 52 are formed in walls 76 of the column 75 that correspond to the end plate 70 affixed to each beam 14. According to one embodiment, the fastening devices/bolts 56 that couple the beams 14 to the column 75 are thru-bolted from the end plate 70, through opposing walls 76 of tube column 75, and through end plate 70 on beam 14 on the opposite side of column 75, with a compression element 64 (comprised of a plurality of Belleville washers 66) being placed on each bolt 56.

Figure 11:
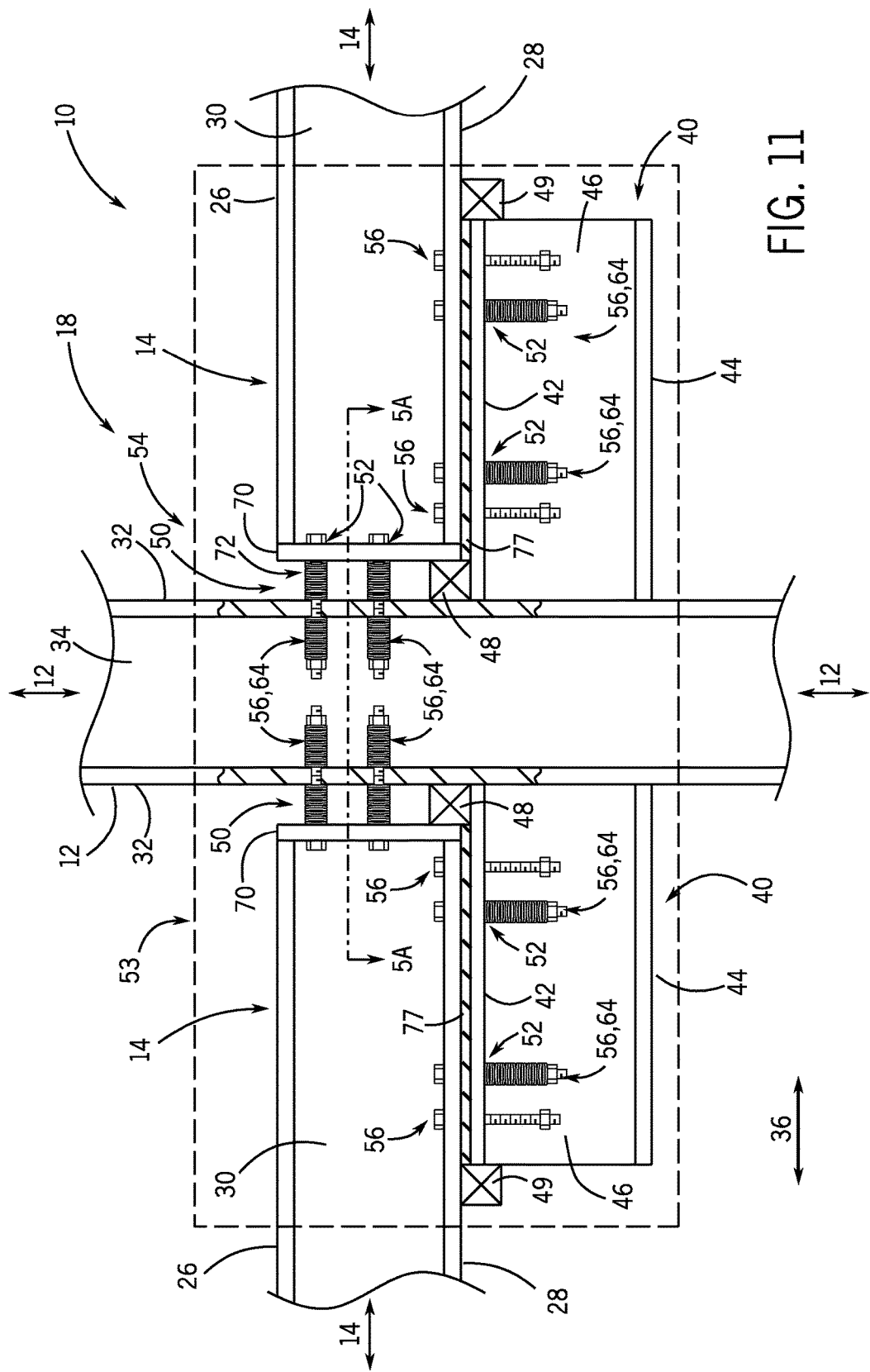
FIG. 11 is a detailed perspective view of an interconnection location in the structural frame of FIGS. 1-4 and discontinuous elastic zone connection located thereat, according to another embodiment of the invention.

Another embodiment of the invention is provided in FIG. 11, wherein the discontinuous elastic zone connection 54 includes an interstitial material 77 positioned between a beam 14 and a supporting beam stub 40 (or haunch or corbel, alternatively). The interstitial material 77 may serve as a compression element in lieu of, or in addition to, the compression element 64 that includes Belleville washers 66.

Beneficially, the use of discontinuous elastic zone connections 54 at intersection locations 18 for coupling beams 14 and columns 12 provides a "strong beam-strong column" construction in structural frame 10 that does not rely upon inelastic deformation of structural members, e.g., beams and braces, as opposed to the typical "weak beam-strong column" construction in which beams with coped flanges acting as "fuses" are prone to, (and expected during their design life in a statistically significant number of instances) undergo inelastic plastic deformation that renders the beam unrepairable.

By implementing discontinuous elastic zone connections 54, greater use of bolted field connections is provided in lieu of welded connections, thereby reducing field man hours per column-beam connection and negating/replacing strict quality control requirements relative to field welded connections. To the extent that welds are still employed at connection locations 18, such as the welding of beam stubs 40 to columns 12, such welds can be performed using factory, i.e., shop assembly, and fabrication processes and procedures such that the fabrication advantages (compared to field welding) typically associated with controlled factory assembly and fabrication (e.g., gas metal arc welding, submerged arc welding, normalizing, heat treatment, stress relief, etc.), can be enjoyed. The discontinuous elastic zone connections 54 also beneficially allow for tuning of the structural frame 10 for changing uses and their loadings throughout the life of the structure, as the specific construction of the discontinuous elastic zone connection 54 can be altered via the substituting, switching or addition of specific components e.g. bolts and Belleville washers thereof.

Figure 12:
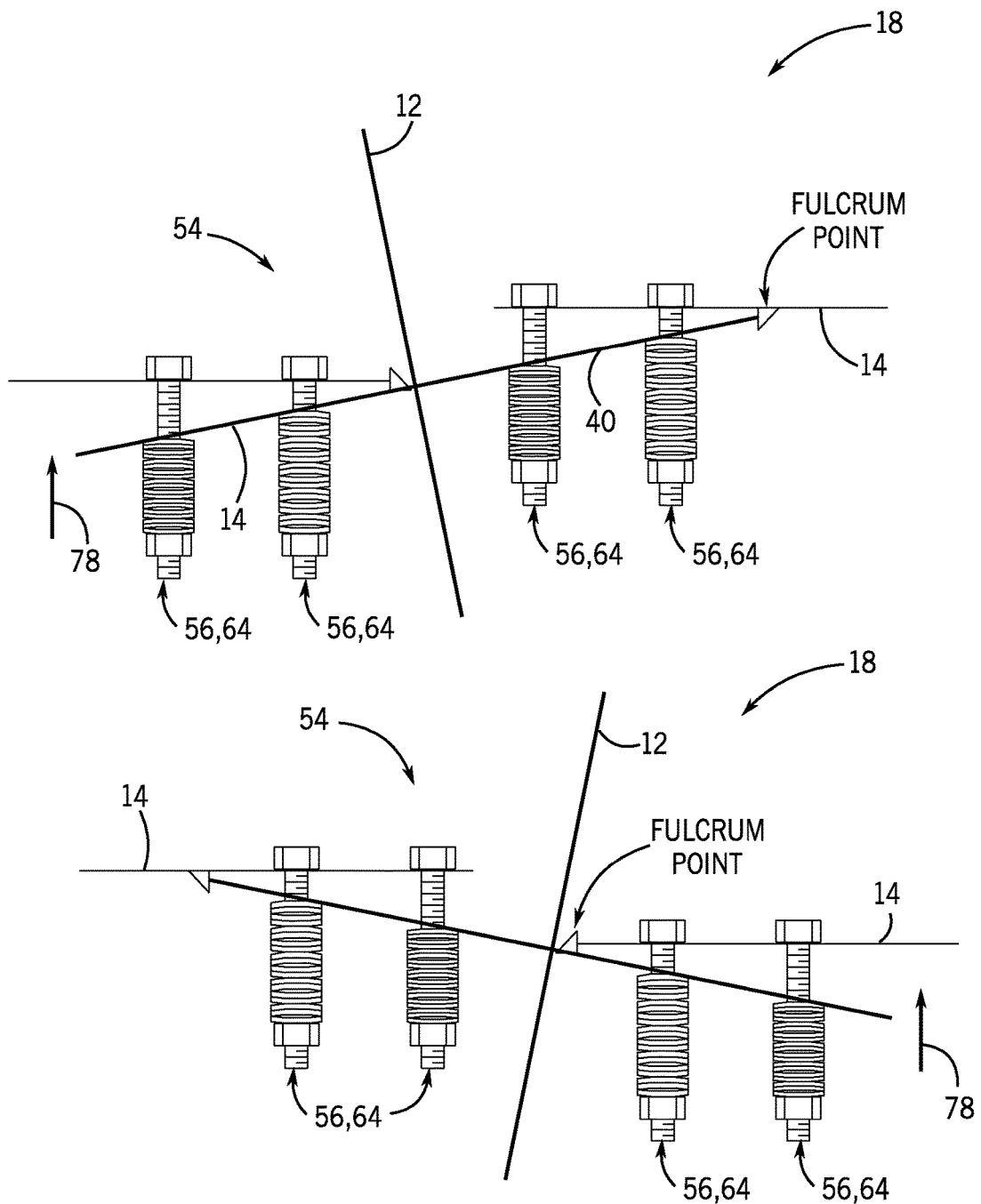
FIG. 12 is a schematic diagram illustrating a shifting of columns and beams in the structural frame of FIGS. 1-4 undergone responsive to application of a horizontal load such as but not limited to seismic or wind, and of a self-righting force applied by a discontinuous elastic zone connection, according to an embodiment of the invention.

In addition to the benefits set forth above that are achievable by implementing of discontinuous elastic zone connection 54 in a structural frame 10, an additional benefit provided by the discontinuous elastic zone connections 54 is the self-righting feature incorporated therein. As shown in FIG. 12, the orientation of a beam stub 40 and beam 14 in structural frame 10 may be changed upon application of a transient load or other load in excess of a prescribed limit to the structural frame 10. The prescribed limit is presumed to be the load corresponding with the deflection/drift of structural frame 10 deemed acceptable absent the transient load criteria e.g. seismic conditions, with the underlying premise that behavior unique to the discontinuous elastic zone connection 54, e.g., angular separation of the faying surfaces, be reserved for relatively rare cases of predictable extreme loading. Despite this premise, situations may exist where it is desirable to allow angular separation of the faying surfaces, or parallel separation of the faying surfaces in the case of other embodiments, in response to more regular or non-transient loading conditions. It is intended that both transient and non-transient situations fall within the scope of this invention.

In the case of FIG. 12, the load is in the horizontal direction. Drift in the direction of the load, i.e. away from the load, beyond the prescribed limit is depicted. This drift of the columns 12, beam stub 40 and beams 14, and angular separation of beam stub 40 and beam 14, is counteracted by a spring force generated by the compression element 64 (FIGS. 6-8) in discontinuous elastic zone connection 54. That is, the discontinuous elastic zone connection 54 applies a self-righting force, indicated as 78, to the plurality of columns 12 and beams 14, such that the structural frame 10, absent the behavior of non frame materials connected to the frame, returns to its original (e.g. pre-seismic load event) orientation (e.g. beams 14 horizontal, and columns 12 vertical) when the transient load and other horizontal loads are removed. This is in contrast to common weak beam-strong column designs where beams undergo permanent deformation beyond the prescribed limit and prohibit part or all of the structure from returning to its original orientation, i.e., pre-seismic event.

According to embodiments of the invention, it is recognized that the construction of various components in structural frame 10 may be altered. As one example, the discontinuous elastic zone connections 54 provided in FIGS. 5 and 11 may additionally include bolts 56 (free of any compression elements thereon) positioned and structured to limit the range of deflection of the column 12—beam 14 connection. As another example, individual ones of the bolt 56/spring element 64/nut 58 assembly elements may be omitted from discontinuous elastic zone connection 54—as a designer may determine them to be necessary in some instances and not necessary in other instances. It is also recognized that leveling washers may be included in the bolt-spring assembly 56, 64 at the beam to column connection. It is further recognized that a singular Belleville washer or plurality of Belleville washers 66 may be replaced (or added onto) with a different type of spring element, such as a coil spring for example.

Figure 5B:
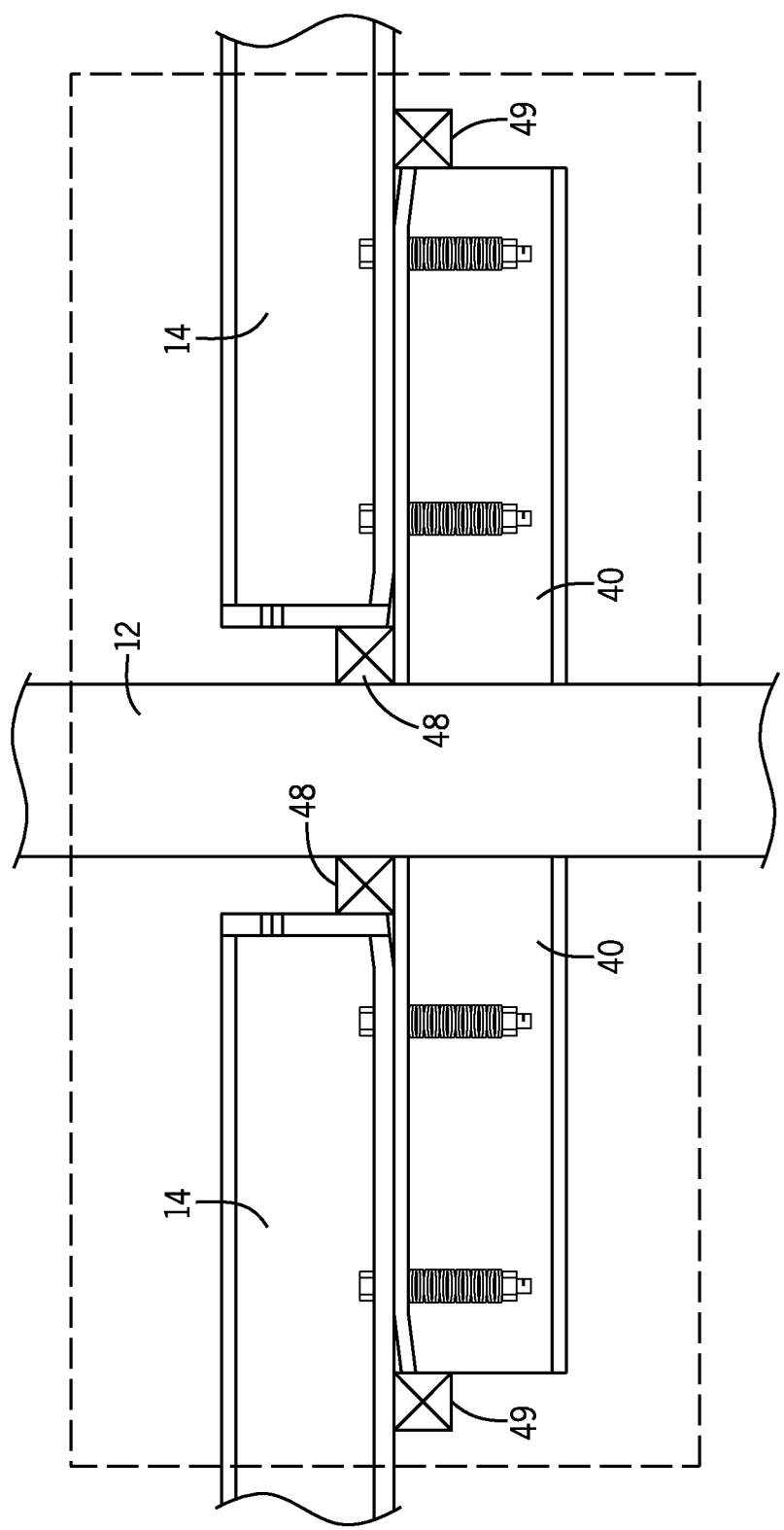
Figure 5C:
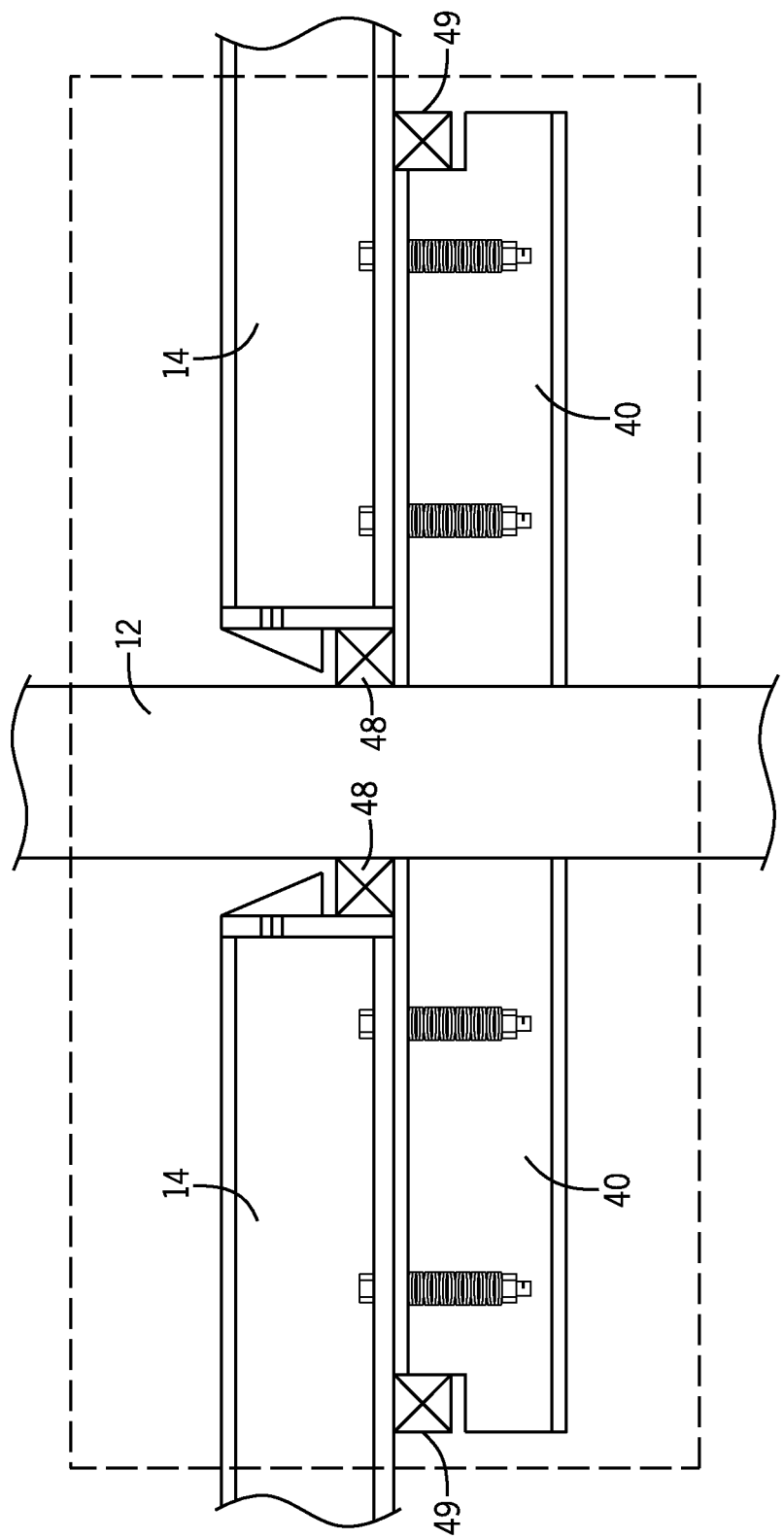
Figure 5D:
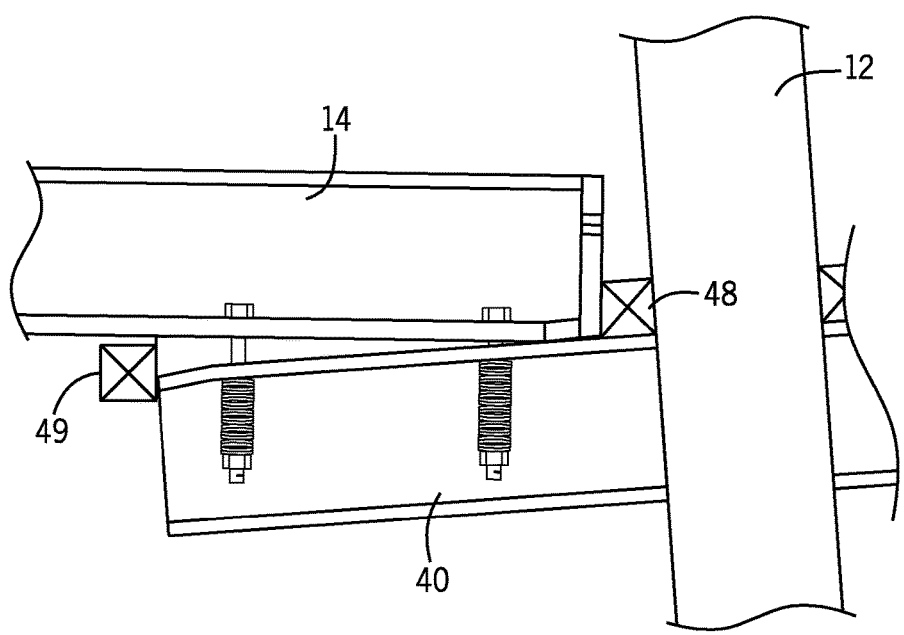
Figure 5E:
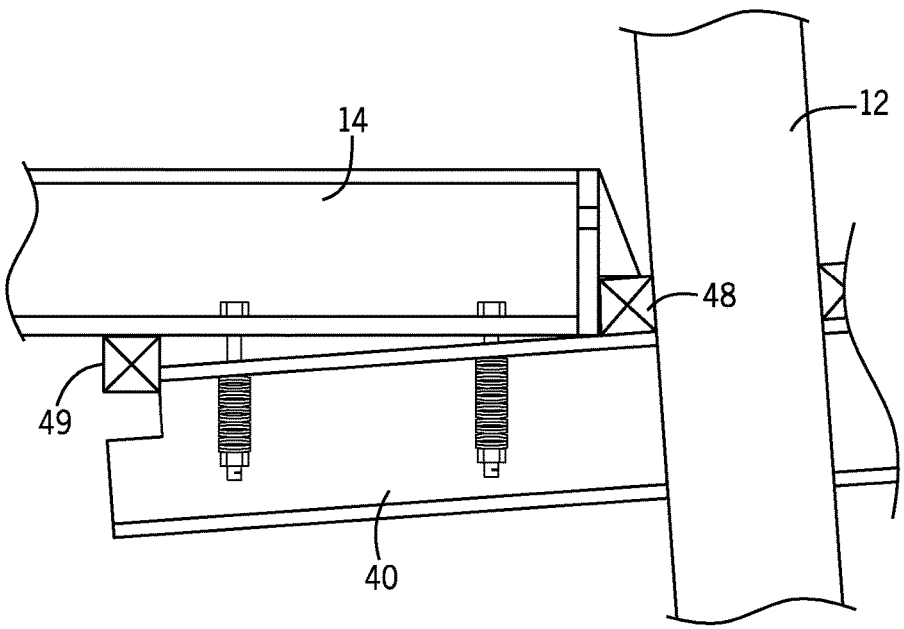

In additional embodiments, the construction of various components in structural frame 10 (such as previously illustrated in FIGS. 5 and 11) may be altered in order to increase or decrease the distance from the face of the column 12 to a fulcrum point as the column 12 and beam 14 deflect—so as to alter the behavior of the system. As an example, and as shown in FIG. 5B, the end of beam 14 adjacent to the column 12 may be modified such that the faying surface at the end of such beam 14 adjacent to the column 12 is tapered, rounded or, as shown in FIG. 5C extended over shear block 48 in a manner that progressively decreases the distance from the longitudinal axis of the column 12 to a fulcrum point as the column 12 and beam 14 deflects, i.e., as the joint/intersection 18 rotates when load is applied away from the column 12 (as shown in FIGS. 5D and 5E). That is, as the column 12 rotates during loading, a condition is created where the distance between bolt 56 and compression element 64 assemblies and the fulcrum point increases, thus affording bolt 56 and compression element 64 assemblies more leverage as the joint rotates and thereby causing the rotational stiffness of discontinuous elastic zone connections 54 to increase as deflection or drift of the structure occurs. As another example, and as shown in FIG. 5B, beam stub 40 may be modified such that the faying surface at the end of such stub opposite the column 12 is tapered, rounded or, as shown in FIG. 5C, extended under shear block 49 in a manner that progressively increases the distance from the longitudinal axis of column 12 to the fulcrum point as the column 12 and beam 14 deflect, i.e as the joint rotates when load is applied toward the column 12, i.e. the rotation opposite that depicted in FIGS. 5D and 5E. That is, as the column 12 rotates, a condition is created where the distance between bolt 56 and compression element 64 assemblies and the fulcrum point increases, thus affording the discontinuous elastic zone connections 54 more leverage as the joint rotates and thereby causing the rotational stiffness of discontinuous elastic zone connections 54 to increase as deflection or drift of the structure occurs.

Referring now to FIGS. 13A-13C, and with reference back to FIGS. 1-4, the braces 20 included in structural frame 10 are shown in detail according to an embodiment of the invention. The brace 20 is constructed to have a multi-piece construction that includes an outer sleeve 80 and an inner sleeve 82, and a second inner sleeve 91 (i.e., first brace portion 80, second brace portion 82, and a third brace portion 91), with the inner sleeves 82 and 91 at least partially nested or positioned within the outer sleeve 80. Each of the inner sleeves 82, 91 includes an end 84 configured to mate with a column/beam 12, 14 at an intersection location 18, if the brace 20 is used alone in a diagonal orientation (FIG. 2), or as a cross brace (FIG. 1), or at an approximate midpoint 21 of a beam 14 when the braces 20 form a chevron bracing (FIG. 3), or at one of these or another connection point when used as a drag strut. To connect the braces 20 to the intersection location 18 and/or midpoint 21, a plurality of plates, gussets, or other attachment points (not shown) are used that are located over, under, or near the beam-column intersection 18 or other location on the column or beam. A single plate or pair of plates may be used for providing the connection.

As shown in FIGS. 13A-13C, the brace 20 includes a discontinuous elastic zone 85 where the outer sleeve 80 is joined to inner sleeve 91, with the discontinuous elastic zone 85 having interstitial elements. In joining the sleeves 80, 91, a connection is made in the discontinuous elastic zone 85 using flanges 95, 96, compression elements (e.g., Belleville washers, configured for compression 99) and, where necessary to assure stability of fastening device 56, one or more lateral support rings 97. The distance between flanges 95, 96 contracts when brace 20 is loaded in compression. The distance between flanges 95, 96 remains constant when brace 20 is loaded in tension.

The brace 20 also includes a discontinuous elastic zone 93 where the outer sleeve 80 is joined to inner sleeve 82, with the discontinuous elastic zone 93 having no interstitial element. In joining the sleeves 80, 82, a connection is made in the discontinuous elastic zone 93 using flanges 86, 90 and associated fastening devices and compression elements (e.g., Belleville washers configured for tension 98 applied to brace 20). The distance between flanges 86, 90 remains constant when brace 20 is loaded in compression. The distance between flanges 86, 90 expands when brace 20 is loaded in tension.

As shown in FIGS. 13A-13C, outer sleeve 80 includes flanges 86, 95 formed thereon at or near the ends of the outer sleeve 80 where it receives the inner sleeves 82, 91. The flanges 86, 95 on outer sleeve 80 extend outwardly from a main body 88 of the outer sleeve 80, such that the flanges 86, 95 have a greater diameter than the outer sleeve 80. The inner sleeves 82, 91 include similar flanges 96, 90 formed thereon, that is, positioned on main bodies 92, 94 of the inner sleeves 82, 91 at a location between ends 84 and flange 86, 95, parallel to flanges 86, 95. The flange 90, 96 on inner sleeve 82, 91 extends outwardly from the main body 92, 94 thereof, such that the flanges 90, 96 have a greater diameter than the inner sleeve 82, 91. According to an exemplary embodiment of the invention, a diameter of the flange 86, 95 on the outer sleeve 80 is equal to the diameter of the flange 90, 96 on the inner sleeve 82, 91, such that the flanges 86, 90, and 95, 96 align with one another.

Each of flanges 86, 90 on the outer sleeve 80 and inner sleeve 82, 91 include a plurality of bolt holes 52 formed therein, with fastening devices 56 (e.g., bolts) being positioned within bolt holes 52 of the flanges 86, 90, and 95, 96 to couple the outer sleeve 80 and inner sleeves 82, 91, so as to form the brace 20. According to embodiments of the invention, the number of bolt holes 52 formed in flanges 86, 90 can vary, with the number of bolt holes 52 formed in flanges 86, 90 being based on the requirements of the structural frame 10 and based on the anticipated loads that the structural frame 10 will be subjected to. Thus, anywhere from two to eight (or more) bolt holes 52 and corresponding fastening devices 56, or more, may be provided through flanges 86, 90, and 95, 96 to couple the outer sleeve 80 to inner sleeves 82, 91.

Regarding the construction of a discontinuous elastic zone connection 100 used to couple the outer sleeve 80 and inner sleeve 82, a number of fastening devices 56 and compression elements 64 configured for responding to tension 98 of brace 20 are included in discontinuous elastic zone connection 100, with an embodiment of such a fastening device-compression element being provided in FIGS. 13A-13C. As shown in FIGS. 13A-13C, and with reference back to FIG. 6, a plurality of bolts 56 is positioned so as to extend through bolt holes 52 formed in flanges 86, 90 with a nut 58 positioned on each bolt 56 on an end opposite the head 60 of the bolt 56, to provide for coupling flanges 86, 90 of the outer and inner sleeves 80, 82. Positioned on each bolt 56 between the flange on the outer sleeve 86 and nut 58 is compression element 98, which is composed of a plurality of deformable, replaceable components 66 in a stacked arrangement 68 with the exact number and orientation (i.e., series vs. parallel) of components 66 varying according to requirements of the structure.

Now regarding the construction of a discontinuous elastic zone connection 101 used to couple the outer sleeve 80 and inner sleeve 91, a number of fastening devices 56 and compression elements 64 configured for responding to compression 99 of brace 20 are included in discontinuous elastic zone connection 101, with an embodiment of such a fastening device-compression element being provided in FIGS. 13A-13C. As shown in FIGS. 13A-13C, and with reference back to FIG. 7, a plurality of bolts 56 is positioned so as to extend through bolt holes 52 formed in flanges 95, 96, with a nut 58 positioned on each bolt 56 on an end opposite the head 60 of the bolt 56, to provide for coupling flanges 95, 96 of the outer and inner sleeves 80, 91. Positioned on each bolt 56 between the flange on the inner sleeve 96, and the flange on the outer sleeve 95 is compression element 99, which is composed of a plurality of deformable, replaceable components 66 in a stacked arrangement 68 with the exact number and orientation (i.e., series vs. parallel) of components 66 varying according to requirements of the structure.

Referring now to FIG. 14, a brace 20 for use structural frame 10 is shown in detail according to another embodiment of the invention, in which it is desired for the brace 20 to act as an oscillating spring and provide damping to the frame. The brace 20 is constructed to have a two-piece construction that includes an outer sleeve 110 and an inner sleeve 112, with the inner sleeve 112 at least partially nested or positioned within the outer sleeve 110. Each of the inner and outer sleeves 112, 110 includes an end 114 configured to mate with a column/beam 12, 14 at an intersection location 18 (FIG. 4), if the brace 20 is used alone in a diagonal orientation, or at a beam midpoint 21 when the brace 20 forms a chevron cross bracing.

As shown in FIG. 14, with reference back to FIG. 8, a discontinuous elastic zone connection 116 couples the outer sleeve 110 and inner sleeve 112, with fastening devices 118 and compression elements 120 being positioned relative to flanges 122, 124 formed on the outer sleeve 110 and the inner sleeve 112. Each of flanges 122, 124 on the outer sleeve 110 and inner sleeve 112 include a plurality of bolt holes 126 formed therein, with the fastening devices 118 (e.g., bolts) being positioned within bolt holes 126 of the flanges 122, 124 to couple the outer sleeve 110 and inner sleeve 112, so as to form the brace 20. The compression elements 120 are positioned between the flanges 122, 124 of the inner and outer sleeves 110, 112 within a discontinuous elastic zone 128, and on one or both sides of the flanges 122, 124 of the inner and outer sleeves 110, 112 outside the discontinuous elastic zone 128, but stacked on the same fastening device 118 spanning the discontinuous elastic zone, so as to form an oscillating spring mechanism which behaves elastically as a mechanical damper for a design load.

Figure 4:
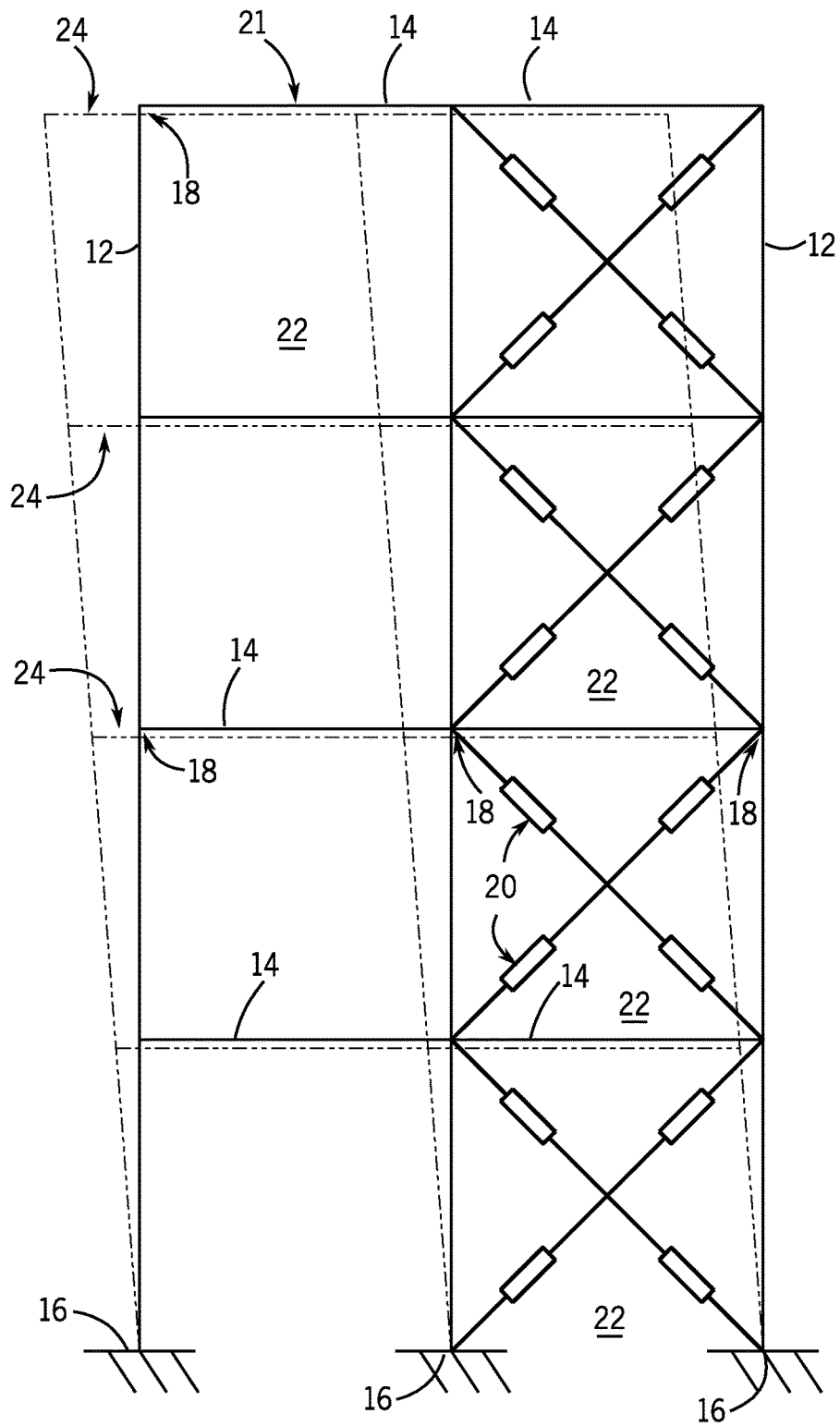

Referring now to FIGS. 15A-15E, with reference back to FIGS. 13A-13C, a brace 20 for use in structural frame 10 is shown in detail according to another embodiment of the invention, when braces 20 are arranged within a frame bay 22 in a cross-brace arrangement (such as in FIGS. 1 and 4). The pair of braces may lie in separate non intersecting planes with one or both such planes not intersecting the centroidal axis of one or both columns to either side of the frame bay. The pair of braces may also lie in the same plane, where such plane may or may not contain the centroidal axis of the columns to either side of the frame bay. To enable the cross braces to occupy the same plane, a hole or similar opening, i.e., a pass-through 129, where one brace 130 may pass-through the other 131 is provided. FIG. 15 depicts this pass through.

Figure 16B:
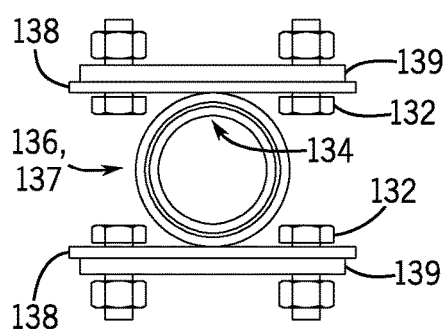
Figure 16C:
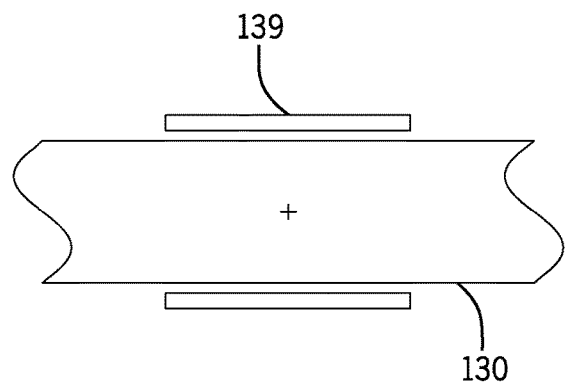
Figure 16B:
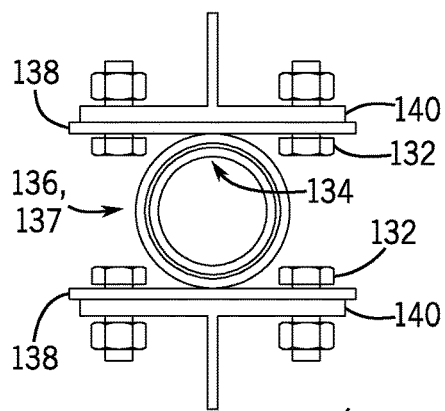
Figure 16C:
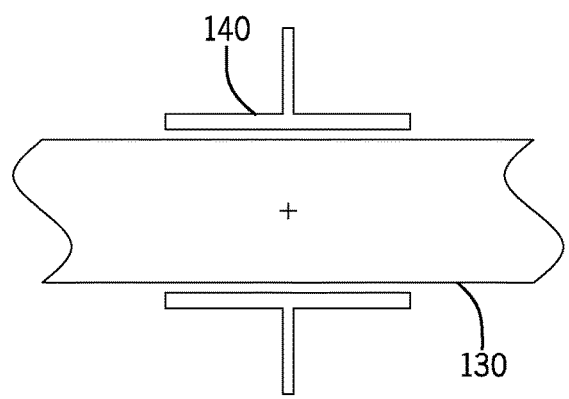

While the braces illustrated in FIGS. 15A-15E are constructed and provided with the intent of the braces being assembled in a cross-brace configuration in the field with a welding operation being utilized as part of the assembly process, it is understood that other embodiments of the invention might provide braces that require no welding in the field during assembly. Referring now to FIGS. 16A-16C, an embodiment of the invention is illustrated when braces 130, 131 are arranged in a cross-brace arrangement and incorporate a bolting feature therein so as to remove the need to weld the braces together in the field. As illustrated in FIG. 16A and the cross-section taken thereof along line B-B in FIG. 16B, a plurality of match plates 138 are provided on brace 131 to permanently secure, e.g., weld, outer sleeves 136 and 137 of the brace to such match plates 138 on opposing sides of outer sleeves 136 and 137 suitable in form and orientation, i.e., position, for connecting spanning members such as plates 139 or other sections capable of mating with sleeves 136 and 137 and having a suitable geometry, i.e., radius of gyration, such as "tee" sections 140 that span from brace 131 compression side outer sleeve 136 to brace 131 tension side outer sleeve 137, positioned on opposing sides of brace 130 such that brace 130 may move between such spanning members 139, 140. That is, brace 130 passes between spanning members 139, 140—with spanning members 139, 140 being fastened with bolts 132 to match plates 138 and match plates 138 being welded to outer sleeves 136 and 137 within the embodiment depicted. The use of bolts 132 for securing an inner sleeve 134 and outer sleeve 136, 137 of brace 131 allow for the positioning of braces 130, 131 to occupy the same plane—with a pass-through/opening 129 allowing brace 130 (i.e., a main body of an outer sleeve of brace 130) to pass-through brace 131—and the subsequent assembly of brace 131 to be bolted around brace 130 upon positioning in the desired cross-brace arrangement without the need for in-field welding.

In still additional embodiments of the invention, the discontinuous elastic zone connections 85, 100, 101 used to join the outer sleeve 80 to inner sleeves 82, 91 of the brace illustrated in FIGS. 13A-13C may be modified. As one example, the compression elements 64, 85 (formed of replaceable components 66) of the discontinuous elastic zone connections 85, 100, 101 that are provided for compression 99 and tension 98 may be replaced with one or more springs (i.e. a "spring set") 142, such as but not limited to a coil spring, as illustrated in FIG. 17A. In such an embodiment, the coil springs 142 may be positioned in a concentric manner about outer sleeve 80, and/or inner sleeve 91, with the addition of a flange 144 and optional removal of lateral support ring 97, as depicted in FIG. 17A. In an exemplary embodiment, the spring set 142 utilized for compression 99 has different spring characteristics than the spring set 142 utilized for tension 98. That is, the tension spring is set so as to allow for tuning of the system and maximizing compression and tension characteristics of the brace element in a safe manner—as a structural element providing a bracing or chord function will often be designed with consideration for tension and compression such that the tensile capacity of the element is a function (i.e., a percentage) of its expected elastic strength, while the compression capacity of the element is a function of buckling (i.e., gross column or localized). With regard to the use of spring sets 142 for compression 99 and tension 98, it is recognize that leveling washers or similar load distributing devices may be included at the ends of the spring sets and/or between individual spring stacks and their respective nuts, bolt heads, and structural surfaces being joined.

As another example of the discontinuous elastic zone connections 85, 100, 101 used to join the outer sleeve 80 to inner sleeves 82, 91—with or without modifying discontinuous elastic zone connections 85, 100, 101 that are provided for compression 99 and tension 98 with one or more springs (i.e. a "spring set") 142—FIG. 17B illustrates that the compression elements 64, 85 of the discontinuous elastic zone connection 101 that are provided for compression 99 may be replaced with a damper mechanism 146. The damper mechanism may be in the form of a damper that is either commercially available or custom designed, such as a viscous damper common to the architectural, engineering, and construction industry. The damper mechanism may be selected to provide optimal damping characteristics during compression loading events of the brace(s) 20. Alternatively, discontinuous connection elements on the compression side of the brace may remain as claimed, and the tension side of the brace modified to a damping function. In either case, the brace retains a discontinuous elastic zone function, with such function being limited to tension or compression and not both as previously depicted.

Embodiments of the invention thus provide discontinuous elastic zone connections, 100, 101, and 116 for constructing a structural brace 20, and a structural damping device in the case of 116; that extends the elastic range of structural framing elements and framing systems, with or without discontinuous elastic zone connections at beam-to-column intersections, for the purpose of (including but not limited to) achieving the allowable inter-story drift associated with a design seismic service load without plastic deformation of beams 14, columns 12, or braces 20. The discontinuous elastic zone connections 54, 100, 101, 116 provide a bias toward self-realignment of the structure subjected to a design service load, such as a seismic event of a given magnitude and characteristic, to its pre-service load (e.g., pre-seismic event) orientation and save economical realignment in instances where design loads and allowable drift are reached or narrowly exceeded. The specific construction of the discontinuous elastic zone connections 54, 100, 101, 116 can be altered via the substituting or switching of specific components thereof, so as to allow for tuning of the structural frame 10 for changing uses and their loadings throughout the life of the structure.

While discussion in the above described embodiments is weighted toward use of Belleville washers as a compression element, it is recognized that other suitable devices could be used as the compression element in or adjacent to the discontinuous elastic zone connections of the present invention. That is, while Belleville washers are emphasized because of their ubiquitous nature, and documented characteristics, which lend well to feasibility of achieving the design concept and its construction with readily available components, it is recognized that the substitution of other compression elements instead of the Belleville washers, having similar spring properties, or different spring like properties is considered to be within the scope of the invention. Additionally, while discussion in the above described embodiments use structural steel connections in the context of building and bridge framing systems subjected to transient loads e.g. seismic loads, to convey the concepts of the invention, it is recognized that the same principals are easily adaptable to other structures constructed of other metals, concrete and wood, and composite framing systems, with the discontinuous elastic zone connections of the present invention providing similar benefits and advantages when used with such materials instead of steel.

Therefore, according to one embodiment of the invention, a structural frame for a building includes a plurality of vertically oriented columns configured to provide gravity and lateral load resisting support to the structural frame, a plurality of horizontally oriented beams coupled to the plurality of columns at a plurality of intersections, a plurality of beam-to-column connections configured to couple the plurality of vertically oriented columns to the plurality of horizontally oriented beams at the plurality of intersections, a plurality of braces positioned in frame bays formed by respective pairs of columns and beams each comprising a multi-piece brace having a plurality of brace portions, and a plurality of discontinuous elastic zone connections to couple the plurality of beams to the plurality of columns via the plurality of beam-to-column connections and/or to couple pieces of the multi-piece brace. Each of the plurality of discontinuous elastic zone connections comprises a plurality of connection mechanisms and a compression element positioned on each of the plurality of connection mechanisms and comprising single component or a plurality of deformable components in a parallel stack, a series stack, or a combination of parallel stacks and series stacks, wherein the compression element is configured to provide elasticity in the structural frame and dampen the effects of transient loads on the structural frame.

According to another embodiment of the invention, a structural frame for a building includes a plurality of vertically oriented columns configured to provide gravity and lateral load resisting support to the structural frame, a plurality of horizontally oriented beams coupled to the plurality of columns at a plurality of intersections, and a plurality of braces positioned in at least a portion of frame bays of the structural frame formed by respective pairs of columns and beams, each of the plurality of braces comprising a multi-piece brace having a plurality of brace portions. The structural frame also includes a plurality of discontinuous elastic zone connections to couple pieces of the multi-piece brace together, wherein each of the plurality of discontinuous elastic zone connections comprises a plurality of connection mechanisms to connect pieces of the multi-piece brace together and deformable members positioned on or adjacent the plurality of connection mechanisms to act in combination with the plurality of connection mechanisms so as to regulate movement of the pieces of the multi-piece brace relative to each other, the deformable members configured to provide elasticity and damping in the structural frame in response to transient loads and overloading applied to the structural frame.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A structural frame for a building comprising:
   a plurality of vertically oriented columns configured to provide gravity and lateral load resisting support to the structural frame;
   a plurality of horizontally oriented beams coupled to the plurality of columns at a plurality of intersections, each of the plurality of beams further comprises an end plate formed on an end of the beam positioned at a respective intersection, the end plate being spaced apart from the column by a gap therebetween and being vertically oriented so as to be generally parallel with a respective column;
   a plurality of beam-to-column connections configured to couple the plurality of vertically oriented columns to the plurality of horizontally oriented beams at the plurality of intersections;
   a plurality of braces positioned in at least a portion of frame bays of the structural frame that are formed by respective pairs of columns and beams, each of the plurality of braces comprising a multi-piece brace having a plurality of brace portions; and
   a plurality of discontinuous elastic zone connections to couple the plurality of beams to the plurality of columns via the plurality of beam-to-column connections and/or to couple pieces of the multi-piece brace;
   a first shear restraint block affixed to the beam-to-column connection and to the column in the gap between the end plate and the column; and
   a second shear restraint block affixed to the bottom side of the beam and in contact with an end of the beam-to-column connection;
   wherein the first and second shear restraint blocks function to allow for rotation and tilting of the beam during a loading event;
   wherein each of the plurality of discontinuous elastic zone connections comprises:
      a plurality of connection mechanisms; and
      a compression element positioned on each of the plurality of connection mechanisms, the compression element comprising a single component or a plurality of deformable components in a parallel stack, a series stack, or a combination of parallel stacks and series stacks;
   wherein the compression element is configured to provide elasticity and damping in the structural frame in response to transient loads and overloading applied to the structural frame.

2. The structural frame of claim 1 wherein each compression element comprises:
   a first deformable member configured to elastically absorb a range of compressive forces in response to compression loading events of the brace; and
   a second deformable member configured to elastically absorb a range of tension forces in response to tension loading events of the brace;
   wherein the first and second deformable members maximize elasticity of the structural frame in order to make use of interstory drift.

3. The structural frame of claim 2 wherein the first deformable member comprises a damper mechanism configured to provide optimal damping characteristics during compression loading events of the brace.

4. The structural frame of claim 2 wherein each of the first deformable member and the second deformable member comprises a spring assembly comprising one or more springs positioned concentrically about a piece of the multi-piece brace, and wherein the first deformable member and the second deformable member have different spring characteristics to enable tuning of the brace and maximizing of compression and tension characteristics of the brace.

5. The structural frame of claim 1 wherein the plurality of braces comprises a first brace and a second brace positioned in an x-brace arrangement within a frame bay; and
   wherein the first brace has a splice and pass-through feature for the second brace in the x-brace arrangement, the first brace further comprising a plurality of bolts to bolt pieces of the multi-piece brace together.

6. The structural frame of claim 1 wherein each of the plurality of beams and beam-to-column connections includes a plurality of holes formed in a flange thereof, with the plurality of holes formed in the flange of a respective beam being aligned with the plurality of holes formed in the flange of a respective beam-to-column connections such that a connection mechanism is positioned at and through a respective hole to couple the beam to the beam-to-column connection.

7. The structural frame of claim 6 further comprising a bolt positioned to couple each beam to a respective beam-to-column connection, with each of the bolts extending through respective holes formed in the beams and beam-to-column connections;
wherein each of the bolts does not include compression elements thereon so as to function to limit a range of deflection between the plurality of beams and the plurality of columns.

8. The structural frame of claim 1 wherein the discontinuous elastic zone connection further comprises an interstitial material positioned between a respective beam and beam-to-column connection to regulate compression forces therebetween.

9. The structural frame of claim 1 wherein each of the column and the end plate includes a plurality of holes formed therethrough, with the plurality of holes formed in the column being aligned with the plurality of holes formed in the end plate such that a connection mechanism is positioned at and through a respective hole to couple the column to the end plate on the beam.

10. The structural frame of claim 1 wherein an end of at least one of the beam and the beam-to-column connection is tapered, rounded, or extended over the respective first and second shear blocks in a manner that increases or decreases a distance from a face of the column to a fulcrum point as the column and the beam deflect.

11. A structural frame for a building comprising:
a plurality of vertically oriented columns configured to provide gravity and lateral load resisting support to the structural frame;
a plurality of horizontally oriented beams coupled to the plurality of columns at a plurality of intersections;
a plurality of braces positioned in at least a portion of frame bays of the structural frame that are formed by respective pairs of columns and beams, each of the plurality of braces comprising a multi-piece brace having a plurality of brace portions including at least one outer sleeve and at least one inner sleeve positioned at least partially within the at least one outer sleeve; and
a plurality of discontinuous elastic zone connections to couple pieces of the multi-piece brace together, wherein each of the plurality of discontinuous elastic zone connections comprises:
a plurality of connection mechanisms to connect pieces of the multi-piece brace together; and
deformable members positioned on or adjacent the plurality of connection mechanisms to act in combination with the plurality of connection mechanisms so as to regulate movement of the pieces of the multi-piece brace relative to each other, the deformable members configured to provide elasticity and damping in the structural frame in response to transient loads and overloading applied to the structural frame;
wherein the deformable members maximize elasticity of the structural frame in order to make use of interstory drift and comprise:
a first deformable member configured to elastically absorb a range of compressive forces in response to compression loading events of the brace; and
a second deformable member configured to elastically absorb a range of tension forces in response to tension loading events of the brace;
wherein at least the second deformable member of the first and second deformable members comprises a spring assembly comprising one or more springs positioned concentrically about a respective one of the at least one outer sleeve and the at least one inner sleeve of the multi-piece brace; and
wherein the first deformable member and the second deformable member are independently configurable and adjustable.

12. The structural frame of claim 11 wherein the first deformable member comprises a damper mechanism configured to provide optimal damping characteristics during compression loading events of the brace.

13. The structural frame of claim 11 wherein the first deformable member comprises a spring assembly comprising one or more springs positioned concentrically about a piece of the multi-piece brace, and wherein the first deformable member and the second deformable member have different spring characteristics to enable tuning of the brace and maximizing of compression and tension characteristics of the brace.

14. The structural frame of claim 11 wherein the plurality of braces comprises a first brace and a second brace positioned in an x-brace arrangement within a frame bay; and
wherein the first brace has a splice and pass-through feature for the second brace in the x-brace arrangement, the first brace further comprising a plurality of bolts to bolt pieces of the multi-piece brace together.

15. The structural frame of claim 11 wherein
the at least one outer sleeve comprises an outer sleeve having a main body and a plurality of flanges extending outwardly from the main body, the outer sleeve having:
a first end having a flange formed thereon and being configured to provide a zone that behaves with greater elasticity than the main body when the brace is acting in compression; and
a second end having a flange formed thereon and being configured to provide a zone that behaves with greater elasticity than the main body when the brace is acting in tension; and
wherein the at least one inner sleeve comprises an inner sleeve at both ends of the outer sleeve positioned at least partially within the outer sleeve, each of the inner sleeves including:
a first end configured to mate with one of the plurality of columns or beams; and
a second end positioned within the outer sleeve, with a flange positioned between the first and second ends and extending outwardly from a main body of the inner sleeve;
wherein the plurality of discontinuous elastic zone connections couple the outer sleeve to the inner sleeves and elastically absorb a range of tension and compression forces to maximize elasticity of the structural frame in order to make use of interstory drift.

16. The structural frame of claim 11 wherein
the at least one inner sleeve comprises an inner sleeve located at the center portion of the brace and having a main body and a plurality of flanges extending outwardly from the main body, the inner sleeve having:
  a first end having a flange formed thereon and being configured to provide a zone that behaves with greater elasticity than the main body when the brace is acting in compression; and
  a second end having a flange formed thereon and being configured to provide a zone that behaves with greater elasticity than the main body when the brace is acting in tension; and
wherein the at least one outer sleeve comprises an outer sleeve located on each end of the inner sleeve positioned at least partially outside of the inner sleeve, each of the outer sleeves including:
  a first end configured to mate with one of the plurality of columns or beams; and
  a second end positioned outside the inner sleeve, with a flange positioned between the first and second ends and extending outwardly from a main body of the outer sleeve;
wherein the plurality of discontinuous elastic zone connections couple the inner sleeve to the outer sleeves and elastically absorb a range of tension and compression forces to maximize elasticity of the structural frame in order to make use of interstory drift.

17. The structural frame of claim 11 wherein a pretension of the first deformable member and/or pretension of the second deformable member may be employed to avoid undesirable oscillation action where a load versus deflection curve does not achieve a vertical orientation along a load axis.

18. The structural frame of claim 11 wherein both first and second deformable members are configured to respond in the same or different manner to tension only or compression only.

* * * * *